United States Patent
Rejeti et al.

(10) Patent No.: US 10,060,333 B2
(45) Date of Patent: Aug. 28, 2018

(54) SYSTEMS AND METHODS FOR ENGINE COOLANT SYSTEM DIAGNOSTICS

(71) Applicant: Ford Global Technologies, LLC, Dearborn, MI (US)

(72) Inventors: Sitaram Rejeti, Royal Oak, MI (US); Robert Roy Jentz, Westland, MI (US); Aed M. Dudar, Canton, MI (US); John Smiley, Southfield, MI (US); Joseph Lyle Thomas, Kimball, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 15/144,394

(22) Filed: May 2, 2016

(65) Prior Publication Data

US 2017/0314455 A1    Nov. 2, 2017

(51) Int. Cl.
*F01P 11/16* (2006.01)
*F01P 11/18* (2006.01)
*F01P 11/20* (2006.01)

(52) U.S. Cl.
CPC .............. *F01P 11/18* (2013.01); *F01P 11/16* (2013.01); *F01P 11/20* (2013.01); *F01P 2023/00* (2013.01); *F01P 2025/13* (2013.01)

(58) Field of Classification Search
CPC ... F01P 11/20; F01P 11/16; F01P 11/18; F01P 11/14
See application file for complete search history.

(56) References Cited

U.S. PATENT DOCUMENTS

| | | | |
|---|---|---|---|
| 6,302,065 B1 | 10/2001 | Davison | |
| 6,321,695 B1 | 11/2001 | Yoo et al. | |
| 7,921,705 B2 | 4/2011 | Hamama et al. | |
| 8,770,834 B2 | 7/2014 | Suzuki | |
| 2002/0099482 A1 | 7/2002 | Reese, II et al. | |
| 2012/0085157 A1* | 4/2012 | Nishigaki | G01M 15/042 73/114.68 |
| 2014/0023107 A1 | 1/2014 | Furuta et al. | |
| 2014/0123918 A1 | 5/2014 | Nethercutt | |

* cited by examiner

*Primary Examiner* — Jacob Amick
(74) *Attorney, Agent, or Firm* — Julia Voutyras; McCoy Russell LLP

(57) ABSTRACT

Methods are provided for engine coolant system diagnostics. In one example, engine coolant system malfunction is indicated based on an engine coolant temperature inference model, whereas in another example engine coolant system malfunction is indicated based on a time-based monitor, where the inference model is enabled at ambient temperatures above a predetermined threshold, and where the time-based monitor is enabled at ambient temperatures below the predetermined threshold. In this way, accurate engine coolant system diagnosis may be accomplished under ambient temperature conditions wherein the engine coolant temperature inference model may be compromised.

18 Claims, 8 Drawing Sheets

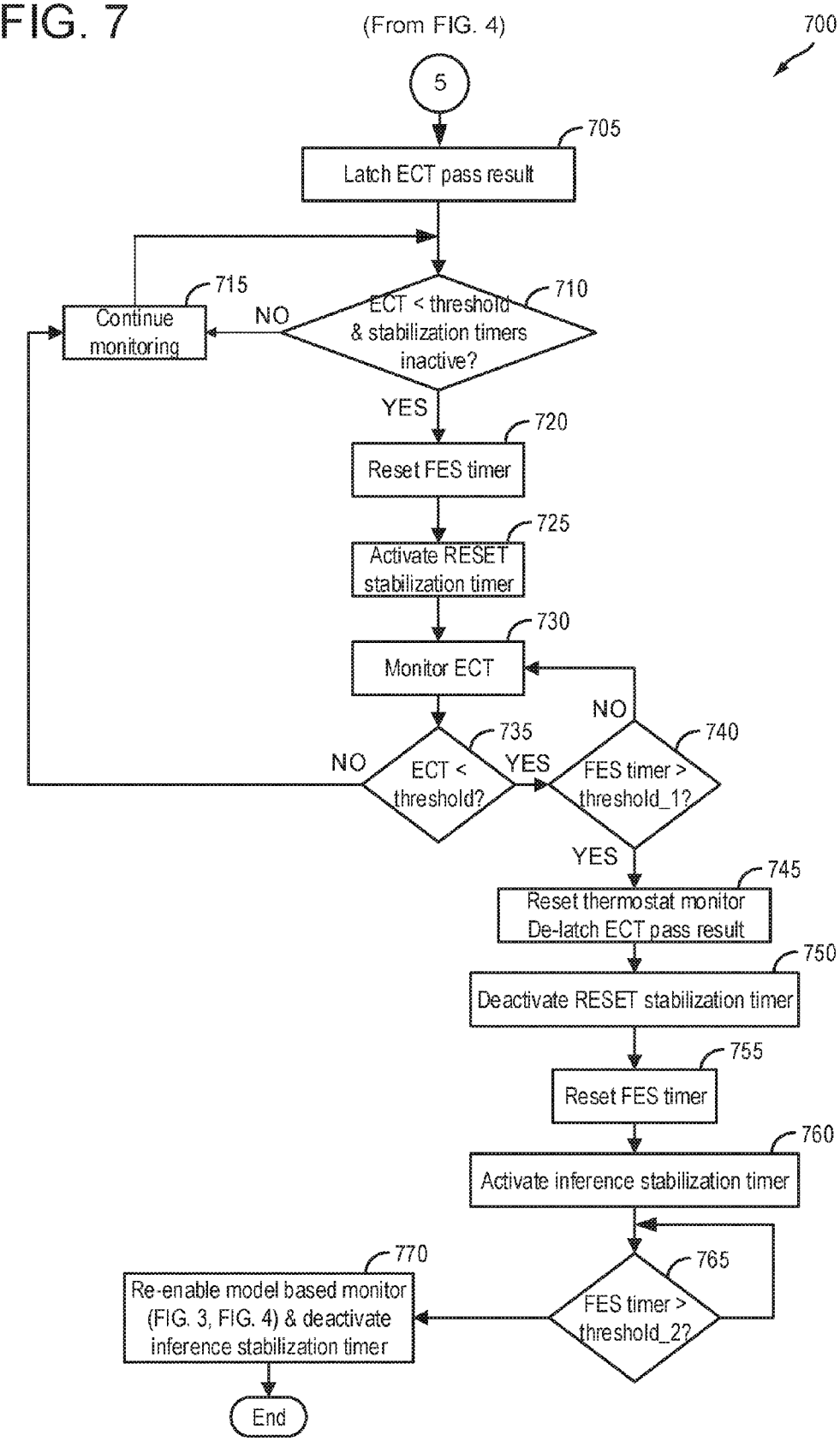

SYSTEMS AND METHODS FOR ENGINE COOLANT SYSTEM DIAGNOSTICS

FIELD

The present description relates generally to methods and systems for continuous thermostat monitoring and engine coolant system diagnostics.

BACKGROUND/SUMMARY

State-of-the-art automotive engine control includes on-board diagnosis of various engine components or sensors, particularly when improper operation of such components or sensors can adversely influence various aspects of engine operation and/or emissions. For example, proper operation of an engine cooling system may be ascertained by diagnosis of whether the engine thermostat is operating correctly (e.g., not stuck open or closed), and if the engine coolant temperature sensor is providing accurate readings. In such an example, if a fault is indicated in one or more of the thermostat or engine coolant sensor, a vehicle controller may store the fault information and activate a malfunction indicator light (MIL) alerting the vehicle operator to service the vehicle.

As an example, automotive diagnostic regulations require the engine cooling system to be monitored for achieving a predetermined coolant target temperature during a predetermined engine warm-up interval. In one example, a thermostat may be considered malfunctioning if the coolant temperature does not reach a specified target temperature within a specified time period after the engine is started. In another example, the engine cooling system may be monitored for achieving a stabilized minimum temperature that is needed for the fuel control system to begin stoichiometric closed-loop operation (e.g., closed-loop enable temperature), within a manufacturer approved time interval after starting the engine. If measured engine coolant temperature does not reach the temperature needed for stoichiometric closed-loop operation, wherein stoichiometric closed-loop operation comprises feedback control of an air/fuel mixture combusted in the engine where a 14.7:1 air/fuel ratio is commanded, a fault may similarly be indicated.

Engine coolant temperature monitoring during engine warm-up conditions may in some examples be based on models to infer engine coolant temperature. For example, U.S. Pat. No. 7,921,705 teaches an engine coolant temperature estimation system comprising a coolant temperature estimation module and a coolant monitoring module. The coolant estimation module estimates an engine coolant temperature based on at least mass air flow, vehicle speed, and ambient temperature. The coolant monitoring module selectively operates a vehicle engine based on the estimated engine coolant temperature. Similarly U.S. Pat. No. 6,302,065 B1 teaches estimating engine coolant temperature based on engine thermodynamic properties, such as net engine torque, air-fuel ratio, engine speed, exhaust gas temperature, etc.

However, the inventors herein have recognized potential issues with such methods. For example, the inventors have recognized that under certain ambient temperature conditions, engine coolant temperature inference models may become inaccurate. As such, the use of an engine coolant temperature inference model under certain ambient temperature conditions may potentially result in falsely diagnosing aspects of engine cooling system function. Furthermore, the above-referenced methods do not teach methodology for continuously monitoring aspects of the vehicle engine coolant system during the course of a drive cycle wherein the engine is used to propel the vehicle.

Thus, the inventors have developed systems and methods to at least partially address the above issues. In one example a method is provided, comprising in a first condition, detecting an engine coolant system malfunction based on an engine coolant temperature inference model, and in a second condition, detecting an engine coolant system malfunction based on a time-based monitor.

As one example, the first condition includes an ambient temperature above 20° F., and the second condition includes an ambient temperature below 20° F. In some examples, the second condition includes an engine start event, where activating the time-based monitor is further based on one or more of engine speed and/or engine load above predetermined thresholds, wherein a fault is indicated responsive to an engine coolant temperature below a predetermined threshold when the time-based monitor expires. In this way, correct diagnosis of engine cooling system function may be accomplished, under conditions wherein engine cooling system function may be incorrectly diagnosed if an engine coolant temperature inference model were relied upon.

In another example, a method is provided, comprising during a first mode of operation of an engine, predicting when temperature of a coolant of the engine exceeds a threshold temperature, wherein the predicting is based on an engine coolant temperature inference model; indicating proper operation of a thermostat regulating flow of the coolant in response to an actual coolant temperature exceeding the threshold; and continuing to monitor for the actual coolant temperature exceeding the threshold after the first mode of operation. As one example, the method includes responsive to an indication of the actual coolant temperature dropping below the threshold for a first predetermined time duration (e.g., reset stabilization) after the first mode of operation, initiating a call to reinitiate the first mode of operation to predict when temperature of the coolant exceeds the threshold temperature, indicating proper operation of the thermostat responsive to actual coolant temperature exceeding the threshold temperature, and wherein initiating the call to reinitiate the first mode of operation occurs any number of times actual coolant temperature drops below the threshold for the first predetermined time duration during a drive cycle. In one example, reinitiating the first mode of operation commences subsequent to a second predetermined time duration (e.g., inference stabilization), the second predetermined time duration greater than the first predetermined time duration, and wherein the predicting when temperature of the coolant of the engine exceeds the threshold temperature is suspended during the second predetermined time duration. In this way, by initiating a call to reinitiate the first mode of operation only after the first predetermined time duration (e.g., reset stabilization), false resets to the first mode due to oscillations/fluctuations around the threshold may be prevented. Furthermore, by only reinitiating the first mode of operation subsequent to a second predetermined time duration (e.g., inference stabilization), false fail calls may be prevented, as methods for predicting when temperature of the coolant of the engine exceeds the threshold temperature are very sensitive to any engine speed and/or load changes close to the threshold. Accordingly, continuous monitoring of a vehicle thermostat during the course of a drive cycle may be accomplished, while false resets and fail calls may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows a flowchart for a high level example method for continuously monitoring a vehicle thermostat during engine operation.

DETAILED DESCRIPTION

The following description relates to systems and methods for conducting a thermostat (Tstat) monitor and/or a time-to-closed-loop (TTCL) monitor, via a model-based approach or a heat-timer-based approach. For example, a model-based approach or a heat-timer based approach may be utilized during an engine start/warmup in order to indicate whether a vehicle thermostat is functioning as desired. In another example, a model-based approach or a heat-timer based approach may be utilized during an engine start/warmup in order to indicate whether a vehicle may enter into stoichiometric closed-loop engine operation. Furthermore, responsive to an indication that the vehicle thermostat is functioning as desired, the thermostat may be continuously monitored during engine operation according to the systems and methods described herein. The Tstat and TTCL monitors may be based on measured and/or inferred temperature of engine coolant in a vehicle coolant system, such as the vehicle coolant system depicted in FIG. 1. During an engine start where ambient temperature is indicated to be above a predetermined threshold, a model-based approach such as that depicted by the timelines of FIG. 2A and FIG. 2B may be used to indicate whether a thermostat if functioning as desired, and/or whether the vehicle may enter into stoichiometric closed-loop engine operation, respectively. Alternatively, if ambient temperature is indicated to be below the predetermined threshold, the model-based approach may not be accurate, and instead a heat-timer approach such as that depicted by the timelines of FIG. 2C and FIG. 2D may be used to indicate whether a thermostat is functioning as desired, and/or whether the vehicle may enter into stoichiometric closed-loop engine operation, respectively. A method for selecting whether to enable the model-based approach, or the heat-timer based approach for either the Tstat monitor or the TTCL monitor based on ambient temperature is depicted in FIG. 3. The model-based approach may include an engine coolant temperature (ECT) inference model, according to the method depicted in FIG. 4. The model-based approach may include a call-delay timer, which prevents a negative call from being made until is it indicated that inferred ECT has remained above a predetermined threshold for a predetermined amount of time. Alternatively, the heat-timer approach may be based on engine operating conditions, in addition to ambient temperature and coolant flow rate, according to the method depicted in FIG. 5. Responsive to a passing result for the Tstat monitor where the model-based approach was utilized to indicate whether the vehicle thermostat is functioning as desired, continuous monitoring of the thermostat may be conducted as illustrated by the timeline depicted in FIG. 6. A method for continuous monitoring of the thermostat during engine operation is illustrated in FIG. 7.

Figure 1A:
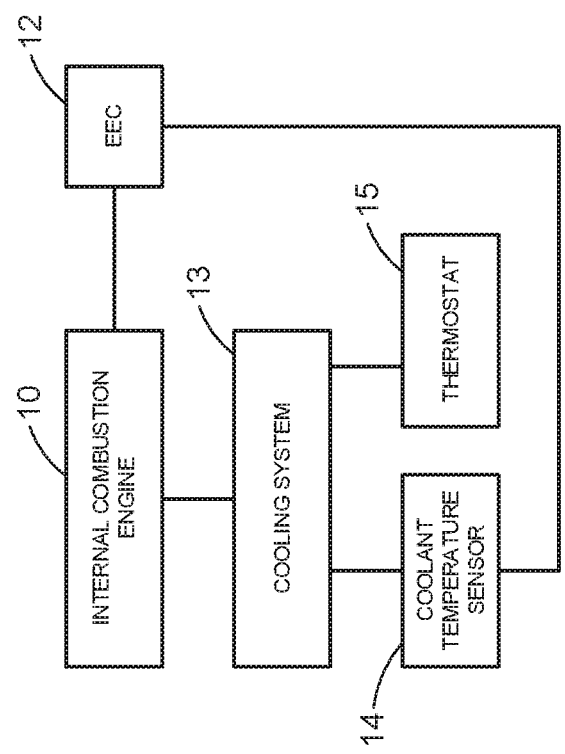
FIG. 1A schematically shows a cooling system for a vehicle.
Figure 1B:
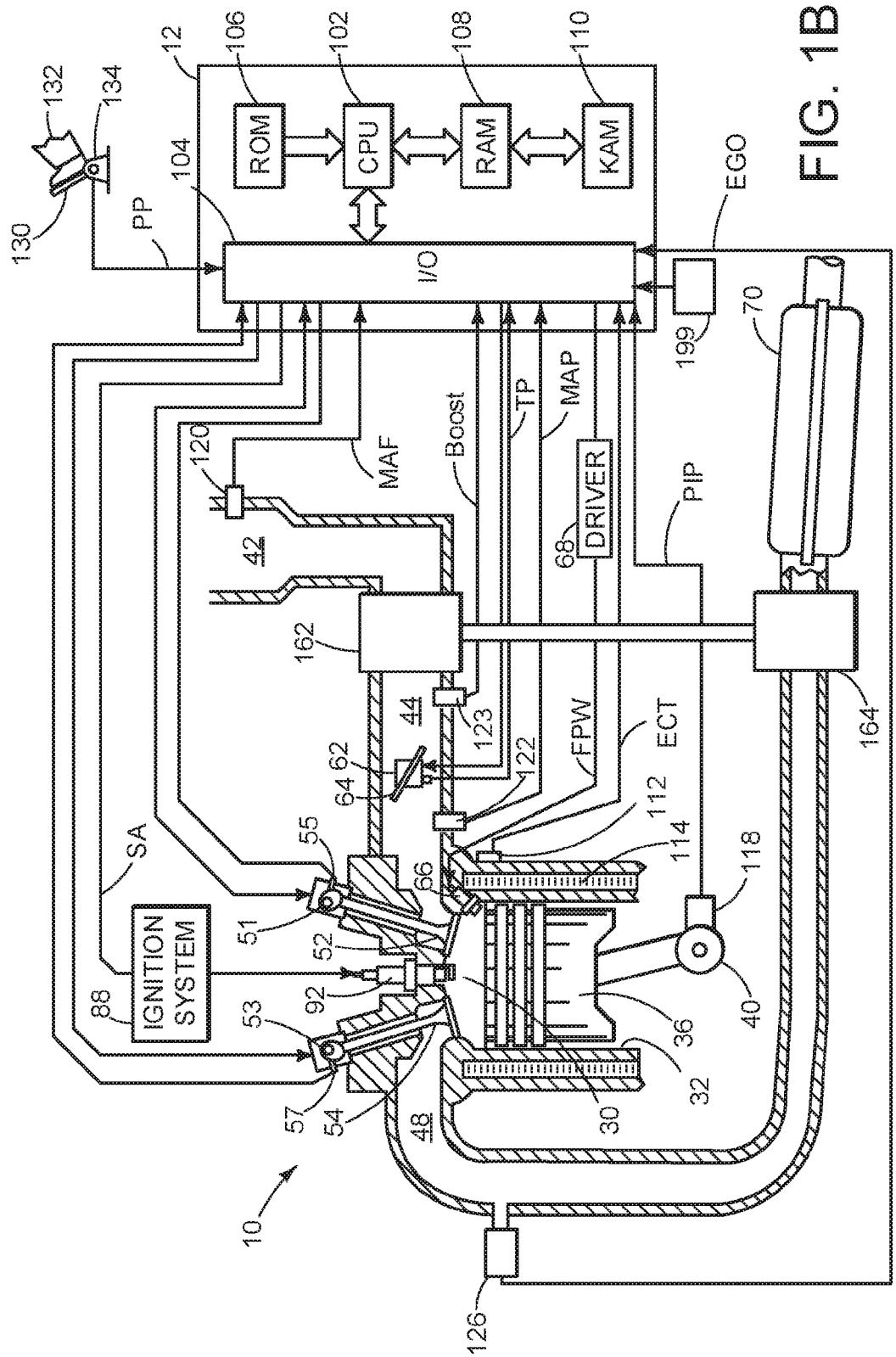
FIG. 1B shows a schematic diagram of an engine.

Referring to FIG. 1A, an internal combustion engine 10, further described herein with particular reference to FIG. 1B, is shown coupled to the electronic engine controller 12, and to the cooling system 13. Cooling system 13 is also coupled to a thermistor-type engine coolant temperature sensor 14, and to a thermostat 15. The thermostat 15 opens a thermostat valve (not shown) when engine coolant temperature exceeds a predetermined high value to allow coolant to circulate and thus facilitate engine cooling. The coolant temperature sensor 15 is also coupled to the electronic engine controller 12. The information provided by the coolant temperature sensor is used in a variety of engine control strategies, such as emissions, fuel injection, etc.

FIG. 1B is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. One or more of a wastegate and a compressor bypass valve may also be included to control flow through the turbine and compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Further, a sensor 123 may be disposed in intake manifold 44 for providing a BOOST signal to controller 12.

Controller 12 is shown in FIG. 1B as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; ambient temperature from ambient temperature sensor 199, and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc. Furthermore, it is to be understood that while FIG. 1B depicts an engine, the depiction described above is exemplary and other vehicle propulsion system configurations are within the scope of this disclosure. For example, the vehicle system may comprise a hybrid vehicle system, where power for propulsion may additionally be derived by an energy conversion device. For example, a hybrid vehicle propulsion system may include an energy conversion device, which may include a motor and a generator, among others, and combinations thereof. The energy conversion device (not shown), may further be coupled to an energy storage device (not shown), which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels (not shown), engine 10 (e.g., provide a motor operation), etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used.

Figure 2A:
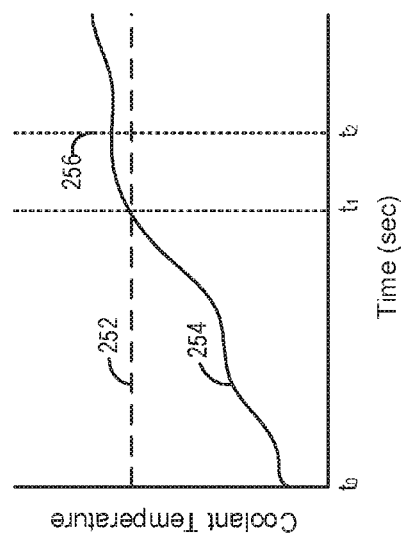
FIG. 2A shows an example timeline for a model-based thermostat monitor.
Figure 2B:
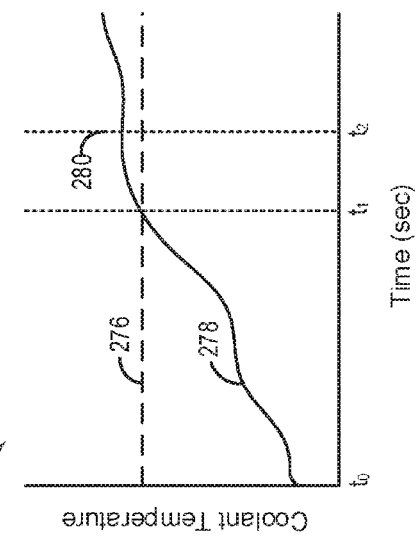
FIG. 2B shows an example timeline for a model-based time-to-closed-loop monitor.
Figure 2C:
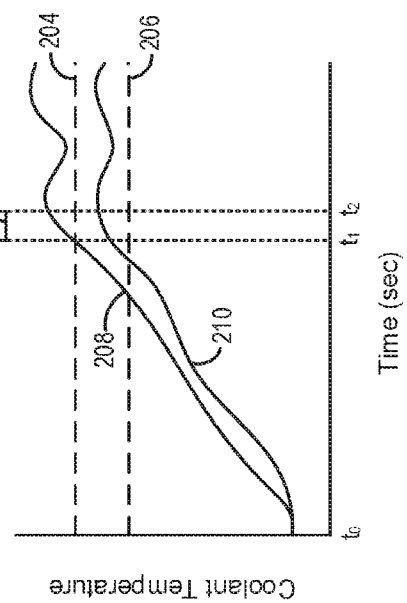
FIG. 2C shows an example timeline for a heat-timer based thermostat monitor.
Figure 2D:
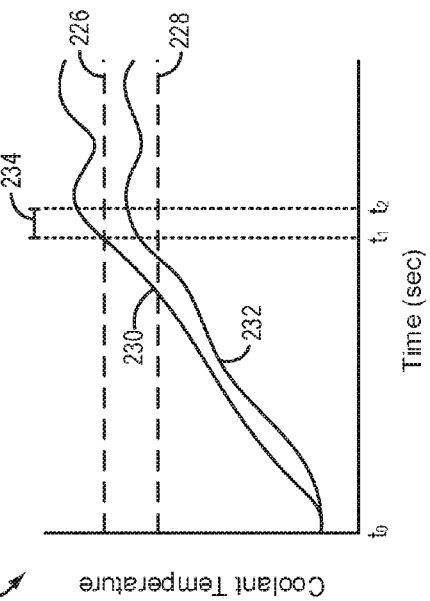
FIG. 2D shows an example timeline for a heat-timer based time-to-closed-loop monitor.
Figure 3:
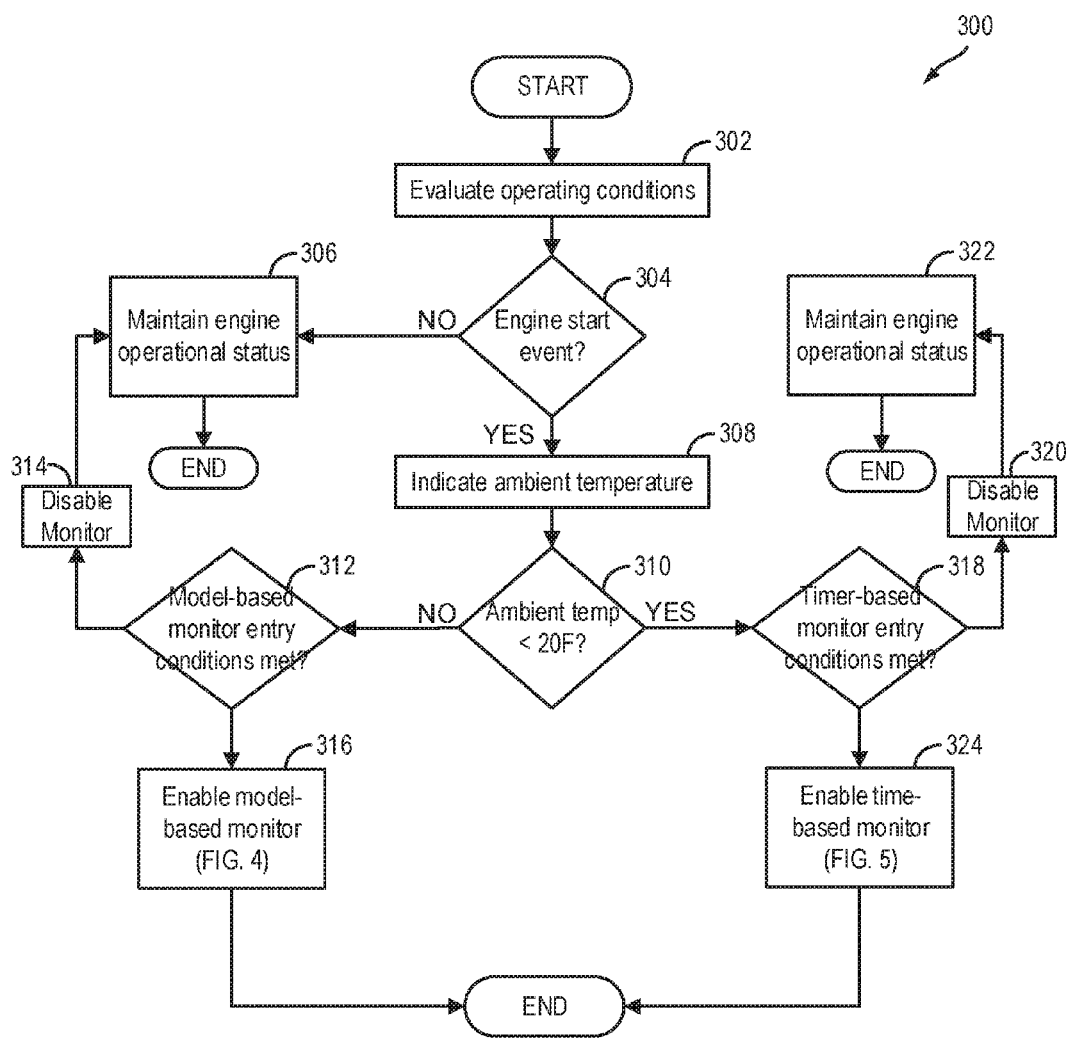
FIG. 3 shows a flowchart for a high level example method for selecting a model-based monitor or a heat-timer based monitor based on ambient temperature.

Turning now to FIGS. 2A-D, for an engine start/warmup event, examples are presented illustrating model-based approaches (FIG. 2A and FIG. 2B) for indicating when an engine coolant temperature (ECT) is expected to be above a fault (e.g. malfunction) threshold, compared to heat-timer-based approaches (FIG. 2C and FIG. 2D) for similarly indicating when ECT is expected to be above a fault threshold. The model-based approaches illustrated in FIGS. 2A and 2B may both comprise the same ECT inference model (discussed in further detail below), and may be applied to indicating whether the vehicle thermostat (Tstat) is functioning as desired (FIG. 2A), and to whether the vehicle may enter into stoichiometric closed-loop operation (closed-loop enable temperature) (FIG. 2B). However, under certain environmental conditions, the accuracy of the ECT inference model may become compromised, for example at ambient temperatures below 20° F. Under such circumstances, rather than using the ECT inference model, a heat-timer based approach may be used (FIGS. 2C-2D). For example, a heat-timer based approach may be used when it is indicated that ambient temperature is below 20° F., under vehicle operating conditions where combustion heat is expected to increase the coolant temperature, and this heat-timer may be compared against a calibratable time threshold. In one example, the thermostat may be indicated to be functioning as desired responsive to measured ECT rising above a fault (e.g., malfunction) threshold prior to the heat-timer reaching a thermostat-specific calibratable time threshold (FIG. 2C). In another example, stoichiometric closed-loop operation may be enabled responsive to measured ECT rising above a closed-loop enable temperature threshold prior to the heat-timer reaching a closed-loop enable-specific calibratable time threshold (FIG. 2D).

While the same ECT inference model may be utilized for indicating whether the vehicle thermostat is functioning as desired, and whether the vehicle may enter into stoichiometric closed-loop operation during an engine-start event, for clarity FIGS. 2A and 2B are illustrated separately. Similarly, while a heat-timer based approach may alternatively be utilized for indicating both of whether the vehicle thermostat is functioning as desired, and whether the vehicle may enter into stoichiometric closed-loop operation during an engine-start event, FIGS. 2C and 2D are also illustrated separately for clarity. For example, in both FIGS. 2A-2B, and 2C-2D, the thresholds for indicating whether the thermostat is functioning properly may be different than the thresholds for indicating whether the engine may enter into stoichiometric closed-loop operation. However, in some examples the thresholds may be the same without departing from the scope of the present disclosure.

FIGS. 2A-2D will now accordingly be described in detail. FIG. 2A, as described above, illustrates a model-based approach 200 for indicating when ECT is above a fault threshold in order to indicate whether the vehicle thermostat is functioning as desired. A Tstat regulating temperature 204, and a Tstat fault threshold 206 are indicated. An inferred ECT 208 is illustrated, over time, the inferred ECT 208 derived from the ECT inference model. Additionally, a measured ECT 210 is indicated, over time, the measured ECT based on, for example, an engine coolant temperature sensor (e.g., 14). Furthermore, a call delay 212 is illustrated, over time, as will be described in further detail below.

At time $t_0$ an engine start is initiated. The thermostat monitor may be initiated to run responsive to ECT temperature entry conditions being met. In one example, the monitor may be enabled to run responsive to an engine start where the ECT is more than 35° F. below the Tstat fault threshold 206. In another example, the monitor may be enabled to run responsive to an engine start where the ECT is below the thermostat fault threshold 206 by any amount. As such, in FIG. 2A, responsive to the engine being started at time $t_0$, the ECT inference model is initiated and inferred ECT 208 is indicated to rise accordingly between time $t_0$ and $t_1$ responsive to engine operation. With the engine in operation, heat from the combustion process heats the engine coolant, and thus measured ECT 210 is indicated to rise between time $t_0$ and $t_1$.

Between time $t_0$ and $t_1$, measured ECT 210 reaches the Tstat fault threshold, and as such a passing result may be indicated and a diagnostic trouble code (DTC) state advanced accordingly. However, in some examples measured ECT 210 may not reach the Tstat fault threshold at a time point wherein inferred ECT 208 reaches the Tstat regulating temperature 204 (e.g., time $t_1$). For example, at time $t_1$ the ECT model may predict that the engine is expected to be fully warmed up to the Tstat regulating temperature 204, where in some examples the Tstat regulating temperature 204 may be a function of ambient temperature. In such an example, if inferred ECT 208 reaches the Tstat regulating temperature while measured ECT 210 is below Tstat fault threshold 206, a call-delay timer 212 may be activated at time $t_1$ to prevent the monitor from making a negative call (e.g., indicating improper operation) or a no-call, as will be discussed in greater detail below, responsive to inferred ECT 208 instantaneously crossing the Tstat regulating temperature 204 at time $t_1$. While the call delay 212 is activated, if measured ECT is indicated to reach Tstat fault threshold 206, a passing result may be indicated. However, if the call delay expires (e.g., at time $t_2$) without the measured ECT 210 reaching the Tstat fault threshold 206, a negative result may in some examples be indicated, while in other examples a no-call may be indicated. For example, if during engine starting it is indicated that the engine has spent greater than 50% of the time in a "no-heat" zone, where engine speed and load are such that engine coolant temperature is not expected to warm significantly, then a no-call may be made. However, if it is indicated that the engine has spent less than 50% of the time in the "no-heat" zone, then a negative call may be indicated. In each example case, whether a passing result, a negative result, or a no-call is indicated, a diagnostic trouble code (DTC) state may be advanced accordingly.

FIG. 2B, as described above, illustrates a model-based approach 225 for indicating when ECT is above a fault threshold in order to begin stoichiometric closed-loop engine operation. As discussed, the same ECT inference model may be utilized as that depicted in FIG. 2A, however the thresholds may be different, and as such, FIG. 2B is illustrated for clarity. A completion threshold 226, and a closed-loop fault threshold 228, are indicated. An inferred ECT 230 is illustrated, over time, the inferred ECT 230 derived from the ECT inference model. Additionally, a measured ECT 232 is indicated, over time, the measured ECT based on, for example, an engine coolant temperature sensor. Furthermore, as described above, a call delay 234 is illustrated, over time.

At time $t_0$ an engine start is initiated. The "time to closed loop" monitor may be initiated to run responsive to ECT temperature entry conditions being met. In one example, the monitor may be enabled to run responsive to an engine start where the ECT is below the closed-loop fault threshold 228. As such, in FIG. 2B, responsive to the engine being started at time $t_0$, the ECT inference model is initiated and inferred ECT 230 is indicated to rise accordingly between time $t_0$ and $t_1$ responsive to engine operation. With the engine in operation, heat from the combustion process heats the engine coolant, and thus measured ECT 232 is indicated to rise between time $t_0$ and $t_1$.

Between time $t_0$ and $t_1$, measured ECT 232 reaches the closed-loop fault threshold 228, and as such a passing result may be indicated and a diagnostic trouble code (DTC) state advanced accordingly. However, in some examples measured ECT 232 may not reach the closed-loop fault threshold 228 at a time point wherein inferred ECT 230 reaches the completion threshold 226 (e.g., time $t_1$). For example, at time $t_1$ the ECT model may predict that the engine is expected to be fully warmed up to the completion threshold 226. In such an example, a call-delay timer 234 may be activated at time $t_1$ to prevent the monitor from making a negative call or a no-call, as will be discussed in greater detail below, responsive to inferred ECT 230 instantaneously crossing the completion threshold 226 at time $t_1$. While the call delay 234 is activated, if measured ECT is indicated to reach the closed-loop fault threshold 228, a passing result may be indicated. However, if the call delay expires (e.g., at time $t_2$) without the measured ECT 232 reaching the closed-loop fault threshold 228, a negative result (e.g., improper operation) may in some examples be indicated, while in other examples a no-call may be indicated. For example, as described above and which will be described in further detail below, if during engine starting it is indicated that the engine has spent greater than 50% of the time in a "no-heat" zone, where engine speed and load are such that engine coolant temperature is not expected to warm significantly, then a no-call may be made. However, if it is indicated that the engine has spent less than 50% of the time in the "no-heat" zone, then a negative call may be indicated. A negative call may include indicating entry conditions are not met for feedback control of an air/fuel mixture combusted in the engine. In each example case, whether a passing result, a negative result, or a no-call is indicated, a diagnostic trouble code (DTC) state may be advanced accordingly.

However, as discussed above, certain environmental conditions may affect the accuracy of the ECT inference model, for example ambient temperatures below 20° F. Under such conditions, a heat-timer approach may be used (FIGS. 2C-2D), described in detail below.

FIG. 2C, as described above, illustrates a heat-timer based approach 250 for indicating when ECT is above a Tstat fault threshold 252. In some examples, the Tstat fault threshold 252 may comprise a threshold engine coolant temperature that is the same as the Tstat fault threshold 206 illustrated in FIG. 2A. However, in some examples, the Tstat fault threshold 252 may not be the same as the Tstat fault threshold 206, and may instead be adjusted based on at least ambient temperature, for example. Additionally, a measured ECT 254 is indicated, over time, the measured ECT based on, for example, an engine coolant temperature sensor, as described above. Furthermore, heat-timer expiration 256, is represented. In some examples, the heat timer may increment above calibrated engine operating conditions like engine speed (RPM) and engine load, an may further increment when RPM is above the pump speed by a calibrated threshold (for HEVs).

At time $t_0$ an engine start is initiated. In this example illustration, it may be understood that the ambient temperature is indicated to be below 20° F., and as such, the ECT inference model may not be accurate. Accordingly, the heat timer may increment responsive to entry conditions being met, such as when engine speed and load are above a calibrated threshold, etc. Furthermore, entry conditions may include an ECT more than 35° F. below a Tstat fault threshold (e.g., 252). In another example, entry conditions for enabling the heat-timer based Tstat monitor may include an ECT below the Tstat fault threshold (e.g., 252) by any amount. Still further, entry conditions for enabling the heat-timer based Tstat monitor may include an indication that battery or system voltage is above a threshold voltage (e.g., 11 volts), that the vehicle is at an elevation below a threshold elevation (e.g., 8000 feet), or that a vehicle power take-off (PTO) unit is not active. As illustrated in FIG. 2C, heat timer expiration 256 is indicated at time $t_2$. Between time $t_0$ and $t_1$, measured ECT 254 is indicated to rise, responsive to engine operation. At time $t_1$, measured ECT 254 is indicated to reach Tstat fault threshold 252. As measured ECT 254 reached Tstat fault threshold 252 at time $t_1$, prior to heat-timer expiration 256 at time $t_2$, a passing result may be indicated. As such, no diagnostic code may be set for thermostat malfunction. In another example, if the measured ECT 254 did not reach the Tstat fault threshold 252 by the heat-timer expiration at time $t_2$, a negative result may be indicated and a diagnostic code may be set indicating thermostat malfunction.

FIG. 2D, as described above, illustrates a heat-timer based approach 275 for indicating when ECT is above a fault threshold in order to being stoichiometric closed-loop engine operation. As discussed, the same heat-timer approach may be utilized as that depicted in FIG. 2C, however the thresholds may be different, and as such, FIG. 2D is illustrated for clarity. A closed-loop fault threshold 276 is indicated, and in some examples the closed-loop fault threshold 276 may comprise a fault threshold that is the same as the closed-loop fault threshold 228 illustrated in FIG. 2B. However, in some examples the closed-loop fault threshold 276 may not be the same as the closed-loop fault threshold 228, and may instead be adjusted based on at least ambient temperature, for example. Additionally, a measured ECT 278 is indicated, over time, the measured ECT based on an engine coolant temperature sensor, as discussed above. Furthermore, heat-timer expiration 280, is represented. In some examples, as discussed above, the heat timer may increment above calibrated engine operating conditions like engine speed (RPM) and engine load, and may further increment when RPM is above the pump speed by a calibrated threshold, in the case of HEVs.

At time $t_0$ an engine start is initiated. In this example illustration, it may be understood that the ambient temperature is indicated to be below 20° F., and as such, the ECT inference model may not be accurate. Accordingly, the heat timer may increment responsive to entry conditions being met, such as when engine speed and load are above a calibrated threshold, etc.

Furthermore, entry conditions may include ECT below the closed-loop fault threshold (e.g., 276). As illustrated in FIG. 2D, heat timer expiration 280 is indicated at time $t_2$. Between time $t_0$ and $t_1$, measured ECT 278 is indicated to rise, responsive to engine operation. At time $t_1$, measured ECT 278 is indicated to reach closed-loop fault threshold 276. As measured ECT 278 reached closed-loop fault threshold 276 at time $t_1$, prior to heat-timer expiration 280 at time $t_2$, a passing result may be indicated. As such, no diagnostic code may be set for cooling system malfunction and stoichiometric closed-loop engine operating entry conditions are met. However, in another example, if the measured ECT 278 did not reach the closed-loop fault threshold 276 by the heat-timer expiration at time $t_2$, a negative result may be indicated and a diagnostic code may be set indicating coolant system malfunction. Further, stoichiometric closed-loop engine operating conditions are not met and open-loop engine operation will continue.

Turning now to FIG. 3, a flow chart for a high level example method 300 for determining whether to enable model-based thermostat (Tstat) and time-to-closed-loop (TTCL) monitors, or heat-timer based Tstat and TTCL monitors responsive to an engine start event, is shown. More specifically, method 300 may be used to indicate an ambient temperature responsive to an engine-start event, and if it is indicated that ambient temperature is less than a threshold, the heat-timer based monitor(s) may be enabled. Alternatively, if it is indicated that ambient temperature is greater than the threshold, the model-based monitor(s) may be enabled. For example, either the model-based monitor or the heat-timer based monitor may be used to indicate whether a vehicle thermostat is functioning as desired, as depicted previously in FIGS. 2A and 2C respectively. In another example, either the model-based monitor or the heat-timer based monitor may be used to indicate when to begin stoichiometric closed-loop engine operation, as depicted previously in FIGS. 2B and 2D. As the aspects of method 300 are the same for whether the method may be utilized for indicating whether the vehicle Tstat is functioning as desired, or whether stoichiometric closed-loop engine operation may commence, both concepts will be described in relation to method 300. Method 300 will be described with reference to the system described herein and shown in FIG. 1A-1B, though it should be understood that similar methods may be applied to other systems without departing from the scope of this disclosure. Method 300 may be carried out by a controller, such as controller 12 in FIG. 1A and FIG. 1B, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIG. 1B. The controller may control fuel system actuators such as fuel injectors (e.g., 66), and other devices such as a thermostat valve, intake and exhaust valve timing, intake valve lift, purge control valve (not shown), air compressor bypass valve (not shown), throttle (e.g., 62), according to the methods below.

Method 300 begins at 302 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, air charge/air mass conditions, fuel injector circuit status, ignition coil and misfire status, crank position status, throttle position status, vehicle soak time status, engine coolant temperature, engine temperature, etc., various fuel system conditions, such as fuel level, fuel type, fuel temperature, etc., various evaporative emissions system conditions, such as a fuel vapor canister load, fuel tank pressure, etc., as well as various ambient conditions, such as ambient temperature, humidity, barometric pressure, etc. Continuing at 304, method 300 includes indicating whether a vehicle engine start event is in progress. An engine start event may comprise a hot start, or a cold start event. For example, an engine cold start may include engine temperature, or engine coolant temperature, being lower than a threshold temperature. In some examples, the threshold temperature may comprise engine temperature, or engine coolant temperature, below a catalyst light-off temperature. In another example, the threshold temperature may comprise a set temperature, which may comprise a temperature below a threshold (e.g., 226, 228) by a predetermined amount (e.g., 35° F.). Similarly, an engine hot start may include engine temperature, or engine coolant temperature that is not below a threshold (e.g., 226, 228) by a predetermined amount (e.g., 35° F.). In still other examples, an engine hot start may include a determination that temperature of one or more catalyst(s) coupled to engine exhaust is at or above a predetermined temperature, that a time since last engine start is less than a preselected time, an indication exhaust gas temperatures are above a predetermined value, etc. If, at 304, an engine start event is not indicated, method 300 may proceed to 306. At 306, method 300 may include maintaining the operational status of the engine. For example, if the engine is off, the engine may be maintained off. If the engine is in operation, engine operation may be maintained and operational control adjusted based on driver demand. Method 300 may then end.

Returning to 304, if an engine start event is indicated, method 300 may proceed to 308, and may include indicating ambient temperature. In one example, ambient temperature may be indicated via vehicle ambient temperature sensor(s) (e.g., 199). However, indicating ambient temperature at 308 may include indicating ambient temperature by any means as known in the art without departing from the scope of the present disclosure. For example, ambient temperature may be indicated via wireless communication from the vehicle to the internet in order to retrieve ambient temperature. In another example, ambient temperature may be communicated to the vehicle via a vehicle operator smartphone, etc.

Proceeding to 310, it may be determined whether ambient temperature is below 20° F. If, at 310, it is indicated that ambient temperature is not below 20° F., method 300 may proceed to 312 and may include indicating whether entry conditions are met for either a ECT inference model-based thermostat (Tstat) monitor, or an ECT inference model-based time-to-closed-loop (TTCL) monitor. As described above, and with regard to FIGS. 2A and 2B, both the Tstat monitor and the TTCL monitor may employ the same ECT inference model in order to indicate whether the thermostat is functioning as desired, and to indicate when stoichiometric closed-loop engine operation may commence. The ECT inference model may comprise a dual-lump capacitance model, and may model either engine metal or coolant temperatures.

As such, at 312, method 300 may include indicating whether entry conditions are met for enabling model-based monitors. In one example, entry conditions for enabling the model-based Tstat monitor may include an ECT more than 35° F. below a Tstat fault threshold (e.g., 206), as described above with regard to FIG. 2A. In another example, entry conditions for enabling the model-based Tstat monitor may include an ECT below the Tstat fault threshold (e.g., 206) by any amount. Still further, entry conditions for enabling the model-based Tstat monitor may include an indication that battery or system voltage is above a threshold voltage (e.g., 11 volts), that the vehicle is at an elevation below a threshold elevation (e.g., 8000 feet), or that a vehicle power take-off (PTO) unit is not active. In other examples, entry conditions for enabling the model-based TTCL monitor may include ECT below a closed-loop fault threshold (e.g., 228), as described above with regard to FIG. 2B. In still other examples, entry conditions may include any one or more of the operating conditions discussed above at step 302 of method 300 being within a predetermined range to enable model-based monitors. If, at 312, entry conditions are not met for the model-based Tstat monitor and/or the model-based TTCL monitor, method 300 may proceed to 314 and may include disabling the monitor(s) for which entry conditions were not met. In one example, only one monitor may be disabled, while the other monitor may remain active. In another example both the Tstat and TTCL monitors may be disabled. If one or more monitor(s) are disabled at 314, method 300 may include proceeding to 306, wherein method 300 may include maintaining engine operational status, as described above. For example, engine operation may be maintained and operational control adjusted based on driver demand.

However, if at 312, entry conditions are met for one or more of the model-based Tstat monitor or the model-based TTCL monitor, method 300 may proceed to 316. At 316, method 300 may include enabling the model-based monitor, according to the method 400 depicted in FIG. 4.

Returning to 310, if it is indicated that ambient temperature is below 20° F., method 300 may proceed to 318 and may include indicating whether entry conditions are met for either a heat-timer based Tstat monitor, or a heat-based TTCL monitor. Entry conditions for the heat-timer based Tstat monitor, or the heat-based TTCL monitor may be similar to those entry conditions described above with regard to step 312 of method 300. For clarity, the entry conditions will be reiterated herein. For example, entry conditions for the heat-timer based Tstat monitor may include an ECT more than 35° F. below a Tstat fault threshold (e.g., 252), as described above with regard to FIG. 2C. In another example, entry conditions for enabling the heat-timer based Tstat monitor may include an ECT below the Tstat fault threshold (e.g., 252) by any amount. Still further, entry conditions for enabling the heat-timer based Tstat monitor may include an indication that battery or system voltage is above a threshold voltage (e.g., 11 volts), that the vehicle is at an elevation below a threshold elevation (e.g., 8000 feet), or that a vehicle power take-off (PTO) unit is not active. In other examples, entry conditions for enabling the heat-timer based TTCL monitor may include ECT below a closed-loop fault threshold (e.g., 276), as described above with regard to FIG. 2D. In still other examples, entry conditions may include any one or more of the operating conditions discussed above at step 302 of method 300 being within a predetermined range to enable heat timer-based monitors.

If, at 318, entry conditions are not met for the heat-timer based Tstat monitor or the heat-timer based TTCL monitor, method 300 may proceed to 320 and may include disabling the monitor(s) for which entry conditions were not met. In one example only one monitor may be disabled, while the other monitor may remain active. In another example, both the Tstat and TTCL monitors may be disabled. If one or more monitor(s) are disabled at 320, method 300 may include proceeding to 322, wherein method 300 may include maintaining engine operational status, as described above with regard to step 306 of method 300. For example, engine operation may be maintained and operational control adjusted based on driver demand.

However, if at 318, entry conditions are met for one or more of the heat-timer based Tstat monitor or the heat-timer based TTCL monitor, method 300 may proceed to 324. At 324, method 300 may include enabling the heat-timer based monitor, according to the method 500 depicted in FIG. 5.

While not explicitly illustrated in FIG. 3, in some examples both the ECT inference model and the time-based monitor may be run in parallel (e.g., dual-monitoring), wherein responsive to an ambient temperature change to below a predetermined threshold (e.g., 20° F.) by a predetermined amount (e.g., hysteresis value) during running the ECT inference model and the time-based monitor in parallel, the ECT inference model may be deactivated. Such an example may include a condition where an engine-start event comprises a vehicle transitioning from a warm ambient temperature to a cold ambient temperature. However, such dual monitoring may not be utilized for a cold-to-warm ambient temperature variation. For such an example, once the heat timer-based model gets initialized at engine start (e.g., at crank), the monitor(s) may get clipped (e.g., locked) into the heat timer-based model.

In still other examples, at 310 ambient temperature may be indicated and if ambient temperature at engine start (e.g., at crank) is below the predetermined threshold (e.g., 20° F.), the heat timer-based Tstat and TTCL monitor(s) may be run (see FIG. 5), and even if ambient temperature increases above the predetermined threshold (e.g., 20° F.), the monitor(s) may not be changed to the model-based monitor(s).

Figure 4:
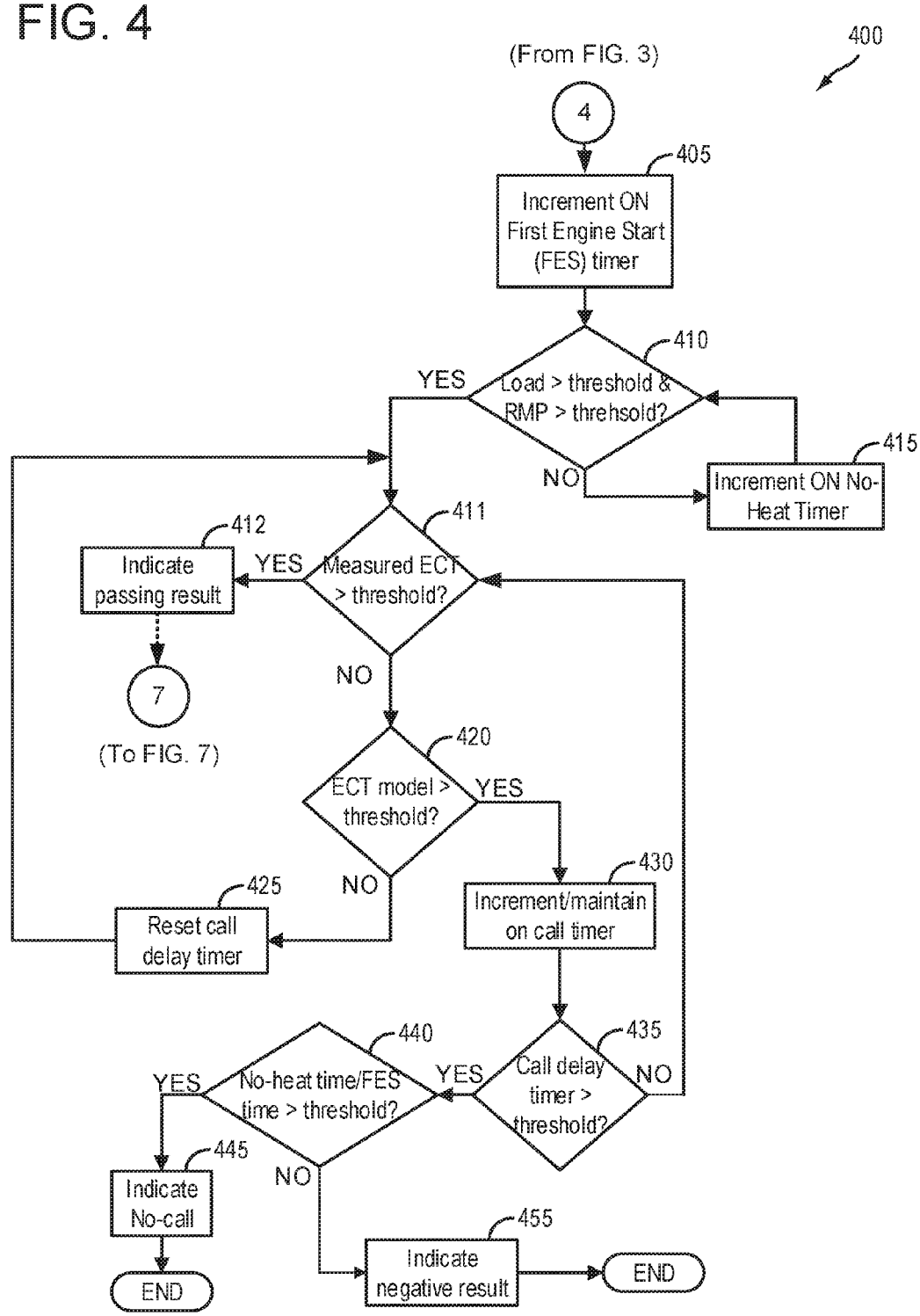
FIG. 4 shows a flowchart for a high level example method for conducting a model-based thermostat monitor and/or a model-based time-to-closed-loop monitor.

In still further examples, at 310 ambient temperature may be indicated and if ambient temperature at engine start (e.g., at crank) is above the predetermined threshold (e.g., 20° F.), the Tstat and TTCL model-based monitor(s) may be run (see FIG. 4). In such an example, if during the trip, ambient temperature falls below the predetermined threshold (e.g., 20° F.) by a predetermined amount (e.g., hysteresis value), the model-based monitor(s) may be deactivated and the heat timer-based Tstat and TTCL monitor(s) may be run (see FIG. 5). Once the heat timer based monitor(s) are initialized, the monitor(s) may be clipped (e.g., locked) into the heat-timer based model for the rest of the trip. In other words, once the heat timer-based monitor(s) are initialized to run, there may be no changing to the model-based monitor(s) during the course of the vehicle trip, even if ambient temperature subsequently is indicated to be above the predetermined threshold (e.g., 20° F.).

Turning now to FIG. 4, a flow chart for a high level example method for running a thermostat (Tstat) monitor and/or a time-to-closed-loop (TTCL) monitor, where the monitor(s) are based on an engine coolant temperature (ECT) inference model, is shown. More specifically, in one example, a thermostat may be indicated to be functioning as desired responsive to a measured ECT above a Tstat fault threshold (e.g., 206), as described above with respect to FIG. 2A. In another example, it may be indicated that a vehicle engine may begin stoichiometric closed-loop engine operation responsive to a measured ECT above a closed-loop fault threshold (e.g., 228), as described above with respect to FIG. 2B. As the aspects of method 400 are the same for whether the method may be utilized for indicating whether the vehicle Tstat is functioning as desired, or whether stoichiometric closed-loop engine operation may commence, both concepts will be described in relation to method 400. Method 400 will be described with reference to the systems described herein and shown in FIGS. 1A-1B, though it should be understood that similar methods may be applied to other systems without departing from the scope of this disclosure. Method 400 may be carried out by a controller, such as controller 12 in FIGS. 1A-1B, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIG. 1B. The controller may control fuel system actuators such as fuel injectors (e.g., 66), and other devices such as a thermostat valve, intake and exhaust valve timing, intake valve lift, purge control valve (not shown), air compressor bypass valve (not shown), throttle (e.g., 62), according to the methods below.

Method 400 begins at 405, continuing from step 316 of method 300, and includes activating a First Engine Start (FES) timer, responsive to the engine startup event commencing. In one example, the FES timer may begin responsive to an indication that the engine has started. For example, the FES timer may begin responsive to engine RPM above a predetermined threshold level. In another example, the FES timer may begin responsive to an engine temperature above a predetermined threshold level. In another example, the FES timer may begin responsive to an indication of engine load above a predetermined threshold level. In some examples, the FES timer may begin based on any combination of engine speed, load, temperature, etc., above predetermined threshold levels. In other examples, the FES timer may begin responsive to an indication of 'first PSA' (Propulsion System Active), in the case of hybrid electric vehicles, as the engine may or may not start for the first 400 seconds of all electric mode. In still other examples, the FES timer may begin responsive to any indication of engine starting known in the art. Responsive to engine start, a value of engine coolant temperature may be captured and the ECT model may be initialized to the value of engine coolant temperature. Furthermore, malfunction thresholds (e.g., fault thresholds 206, 228) may be determined (e.g., set) as a function of ambient temperature. Additionally, responsive to initializing the ECT model to the value of engine coolant temperature at engine start, a calibrated transport delay time may be incremented. Responsive to the transport delay time expiring, the ECT model may be run and updated continuously.

Proceeding to 410, method 400 includes indicating whether engine speed (e.g., RPM), and engine load are greater than predetermined threshold values. In one example, the predetermined engine speed and engine load threshold values may comprise values wherein, if engine speed and/or engine load are below the thresholds, heat from the engine may not be expected to significantly increase engine coolant temperature. In other words, below predetermined engine speed and load, a "no-heat" condition may be indicated, wherein engine coolant temperature is not expected to increase substantially. As will be discussed in further detail below, if during an engine startup/warmup event, if the engine is indicated to have been running for more than fifty percent of the time in the no-heat condition, a no-call may be indicated as to whether a Tstat is functioning as desired, or whether an engine coolant temperature has reached a point where stoichiometric closed-loop engine operation may begin. As such, at 410, if it is indicated that one or more of engine load and engine speed are below predetermined thresholds, method 400 may proceed to 415. At 415, method 400 may include activating a "no heat" timer. In one example, the no-heat timer may be activated responsive to one or more of engine speed and/or load dropping below the predetermined threshold values, as described above. Responsive to an indication that one or more of engine speed and/or load have risen above the predetermined threshold(s), the no-heat timer may be stopped, but may not be reset. Instead, responsive to one or more of engine speed and/or load dropping again below the predetermined threshold(s), the no-heat timer may be reactivated, thus further accruing time that the vehicle is indicated to be spending in the no-heat condition. As such, at any time during the course of method 400 where one or more of engine speed and/or load drops below the predetermined thresholds, the no-heat timer may be reactivated such that a total amount of time that the engine spends in the no-heat condition may be determined.

Proceeding to 411, method 400 may include indicating whether measured ECT (e.g., 210, 232) is greater than predetermined thresholds (e.g., 206, 228). More specifically, if the Tstat monitor is running, it may be indicated whether measured ECT is above a Tstat fault threshold (e.g., 206). Alternatively, if the TTCL monitor is running, it may be indicated whether measured ECT is above a closed-loop fault threshold (e.g., 228). If, at 411, it is indicated that measured ECT is above the Tstat fault threshold, for the case where the Tstat monitor is running, or if it is indicated that measured ECT is above the closed-loop fault threshold for the case where the TTCL monitor is running, method 400 may proceed to 412 where a passing result may be indicated. For example, if the Tstat monitor is running, a passing result for the Tstat monitor may be indicated and a diagnostic trouble code (DTC) state advanced accordingly. If the TTCL monitor is running, a passing result for the TTCL monitor may be indicated, and a DTC code state advanced accordingly. Responsive to a passing result, in some examples method 400 may proceed to FIG. 7, as described in further detail below.

Returning to 411, if it is indicated that measured ECT is below the Tstat fault threshold (e.g., 206), for the case where the Tstat monitor is running, or if it is indicated that measured ECT is below the closed-loop fault threshold (e.g., 228), for the case where the TTCL monitor is running, method 400 may proceed to 420.

At 420, method 400 may include indicating whether the ECT inference model is greater than a predetermined threshold. In one example, the Tstat monitor may be running, and as such, it may be indicated when an inferred ECT (e.g., 208) has reached a Tstat regulating temperature (e.g., 204), as described above with regard to FIG. 2A. In another example, the TTCL monitor may be running, and as such, it may be indicated when an inferred ECT (e.g., 230) is indicated to be above a completion threshold (e.g., 226), as described above with regard to FIG. 2B. If, at 420 the ECT inference model is not indicated to be above a predetermined threshold (e.g., 204, or 226), method 400 may proceed to 425. At 425, method 400 may include resetting a "call delay" timer (e.g., 212). As described above with regard to FIGS. 2A-2B, a call delay timer may be initiated in order to prevent potentially falsely setting a code as a result of the inferred ECT (e.g., 208, 230) estimate instantaneously crossing the predetermined threshold(s) (e.g., 204, 226). As such, responsive to an indication that inferred ECT as derived from the ECT inference model is below the predetermined thresholds, the call delay timer may be reset.

Returning to 420, if inferred ECT as derived from the ECT inference model is indicated to have reached or exceeded the predetermined threshold(s) (e.g., 204, 226), method 400 may proceed to 430. At 430, method 400 may include activating the call delay timer. Activation of the call delay timer may thus prevent method 400 from proceeding until the ECT inference model is indicated to have exceeded the predetermined threshold(s) (e.g., 204, 226) for a predetermined time threshold. Accordingly, at 435, method 400 includes indicating whether the call delay timer has reached the predetermined time threshold. As indicated above, in some examples the call delay predetermined threshold may comprise three seconds, although in other examples the call delay predetermined threshold may comprise greater than, or less than, three seconds. If, at 435, it is indicated that the call delay timer has not reached the predetermined threshold, method 400 may comprise returning to 411. If, during the call delay time period, it is indicated that measured ECT (e.g., 210, 232) is greater than predetermined thresholds (e.g., 206, 228), method 400 may include indicating a passing result at 412 as described above. If measured ECT is not indicated to be greater than predetermined thresholds while the call delay is activated, it may be indicated whether the ECT inference model is still above the predetermined threshold(s) (e.g., 204, 226). As discussed above, if the ECT inference model is not still above the predetermined threshold(s), method 400 may include resetting the call delay timer at 425. Alternatively, if the ECT inference model exceeds the predetermined threshold(s) for the predetermined time threshold while the measured ECT remains below predetermined threshold(s) (e.g., 206, 228), method 400 may proceed to 440.

At 440, method 400 may include indicating whether a ratio of "no-heat" time during the engine start/warmup to the total time since engine start (based on the FES timer) is greater than a predetermined threshold. For example, the ratio of no-heat time to total engine run time since the start (FES) may be referred to as an "idle ratio". In one example, if it is indicated that the idle ratio is greater than 0.5 (e.g., greater than 50% of the total engine run time since FES spent in a no-heat zone), method 400 may proceed to 445. At 445, a no-call may be made. For example, if the Tstat monitor was running, a no-call may be made as to whether the Tstat is functioning as desired and a diagnostic trouble code (DTC) state may be advanced accordingly. In another example, if the TTCL monitor was running, a no-call may be made as to whether the engine may enter into stoichiometric closed-loop engine operation and a DTC state may be advanced accordingly. Responsive to a no-call wherein the TTCL monitor was running, the engine controller may continue to operate in an open-loop manner. For example, a fuel pulse width may be determined from the mass air flow entering the engine and the desired air/fuel ratio without short term feedback correction from the exhaust gas oxygen sensor (e.g., 126).

Returning to 440, if it is indicated that the idle ratio is not greater than the predetermined threshold (e.g., 0.5), method 400 may proceed to 455 where a negative result may be indicated. For example, if the Tstat monitor is running, a negative result for the Tstat monitor may be indicated and a DTC state advanced accordingly. If the TTCL monitor is running, a negative result for the TTCL monitor may be indicated and a DTC state advanced accordingly.

Figure 5:
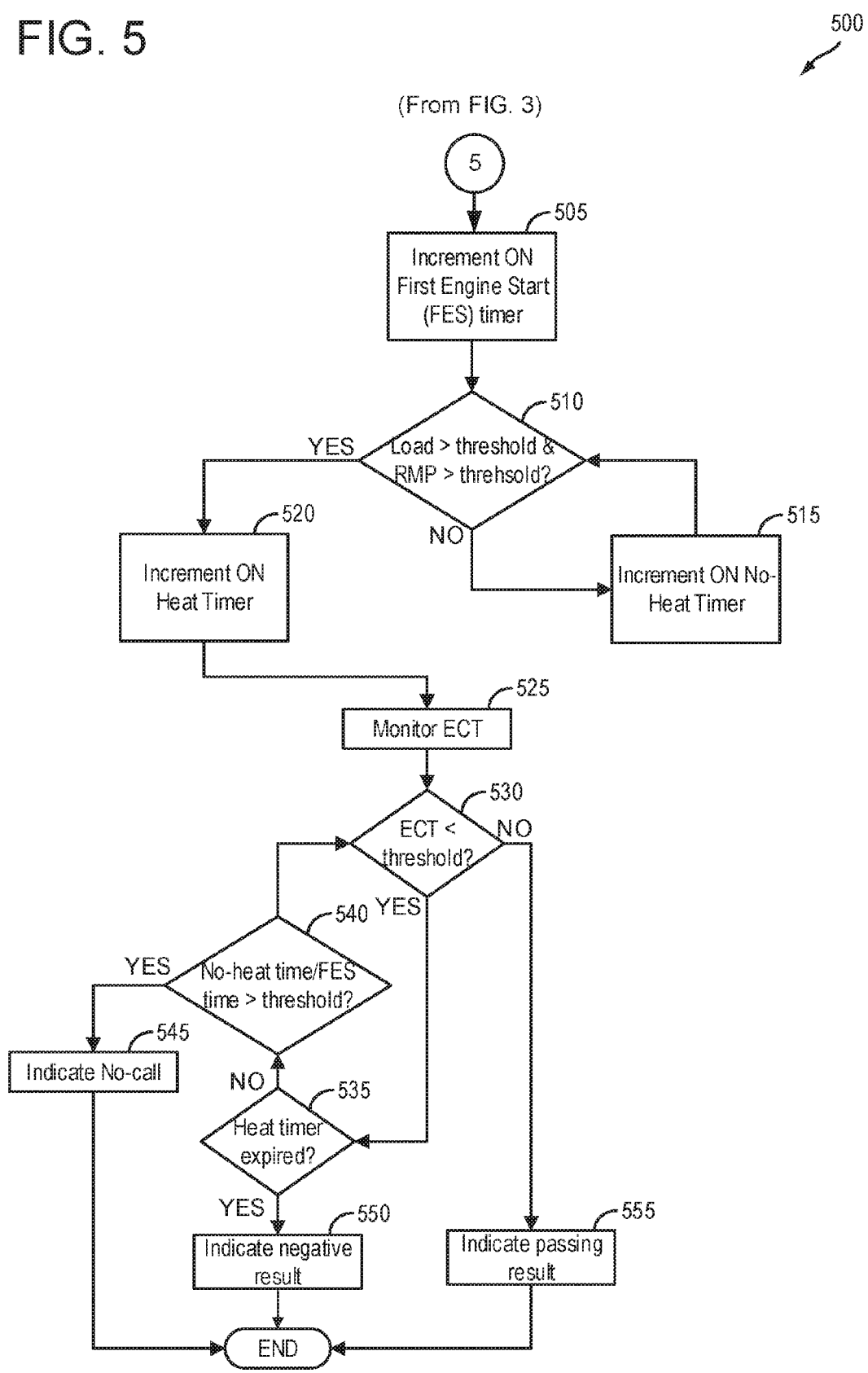
FIG. 5 shows a flowchart for a high level example method for conducting a heat-timer-based thermostat monitor and/or a heat-timer based time-to-closed-loop monitor.

Turning now to FIG. 5, a flow chart for a high level example method for running a thermostat (Tstat) monitor and/or a time-to-closed-loop (TTCL) monitor, where the monitor(s) are based on a heat timer (time-based monitor), is shown. More specifically, method 500 continues from method 300 and includes indicating whether a vehicle thermostat is functioning as desired, as depicted previously in FIG. 2C, or whether a vehicle may begin stoichiometric closed-loop engine operation, as depicted in FIG. 2D, where both monitors are based on a heat-timer, as described above and described in further detail below. The heat-timer based Tstat monitor and/or TTCL monitor may be enabled based on ambient temperature being indicated to be below a threshold ambient temperature (e.g., 20° F.), as described above with regard to FIG. 3. The heat-timer based (time-based) monitor(s) may comprise an engine start-event, where activating the time-based monitor(s) are based on one or more of engine speed and/or engine load above predetermined thresholds, and wherein a fault is indicated responsive to an engine coolant temperature below a predetermined threshold when the time-based monitor expires. As the aspects of method 500 are the same for whether the method may be utilized for indicating whether the vehicle Tstat is functioning as desired, or whether stoichiometric closed-loop engine operation may commence, both concepts will be described in relation to method 500. Method 500 will be described with reference to the system described herein and shown in FIGS. 1A-1B, though it should be understood that similar methods may be applied to other systems without departing from the scope of this disclosure. Method 500 may be carried out by a controller, such as controller 12 in FIGS. 1A-1B, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIG. 1B. The controller may control fuel system actuators such as fuel injectors (e.g., 66), and other devices such as a thermostat valve, intake and exhaust valve timing, intake valve lift, purge control valve (not shown), air compressor bypass valve (not shown), throttle (e.g., 62), according to the methods below. It may be understood that certain aspects of method 500 are the same as aspects of FIG. 4, however for clarity the details will be briefly reiterated herein with regard to method 500.

Method 500 begins at 505, continuing from step 324 of method 300, and includes activating a First Engine Start (FES) timer, responsive to the engine startup event commencing, as described above with regard to FIG. 4. The FES timer may begin responsive to an indication that the engine has started, and may include an indication of engine RPM and/or load above a predetermined threshold level, engine temperature above a predetermined threshold level, or a combination of engine speed, load, temperature, etc., above predetermined threshold levels.

Proceeding to 510, method 500 may include indicating whether engine speed, and engine load, are greater than predetermined threshold values. For example, the predetermined engine speed and engine load threshold values may comprise values wherein, if engine speed and/or engine load are below threshold values, heat from the engine may not be expected to significantly increase engine coolant temperature (ECT), as described above with regard to FIG. 4. Conditions where engine speed and engine load are below predetermined thresholds may thus comprise "no-heat" conditions, where ECT is not expected to increase substantially. For hybrid electric vehicles (HEVs), it may be further indicated whether engine RPM is above the pump speed by a calibrated threshold. As such, at 510, if it is indicated that one or more of engine speed and engine load are below predetermined thresholds (or if engine RPM is below the pump speed by a calibrated threshold in the case of HEVs), method 500 may proceed to 515. At 515, method 500 may include activating a "no-heat" timer, as described above with regard to FIG. 4. If, during an engine startup/warmup event, the engine is indicated to have been running for more than fifty percent of the time in the no-heat condition a no-call may be indicated as to whether a Tstat is functioning as desired, or whether an ECT has reached a point where stoichiometric closed-loop engine operation may begin. In one example, the no-heat timer may be activated responsive to one or more of engine speed and/or load dropping below the predetermined threshold values (or engine RPM dropping below pump speed by a calibrated amount in the case of HEVs), as described above. Responsive to an indication that one or more of engine speed and/or load have risen above the predetermined threshold(s) (or engine RPM has risen above the pump speed by a calibrated amount in the case of HEVs), the no-heat timer may be stopped, but may not be reset. As such, at any time during the course of method 500 where one or more of engine speed and/or load drops below the predetermined thresholds (or engine RPM drops below pump speed by a calibrated amount), the no-heat timer may be reactivated such that a total amount of time that the engine spends in the no-heat condition may be determined.

Returning to 510, if it is indicated that engine speed and engine load are above predetermined thresholds (and RPM is above pump speed by a calibrated amount in the case of HEVs), method 500 may proceed to 520. At 520, method 500 may include activating a "heat" timer. Conditions where engine speed and load are above predetermined thresholds (and RPM is above pump speed by a calibrated amount in the case of HEVs), may thus comprise "heat" conditions, where engine coolant temperature is expected to increase substantially. More specifically, the heat timer may comprise an amount of time, where it may be expected that a measured engine coolant temperature may be above a Tstat fault threshold (e.g., 252) in the case of a Tstat monitor, or above a closed-loop fault threshold (e.g., 276) in the case of a TTCL monitor, as described above with regard to FIGS. 2C and 2D, respectively. In some examples, the heat-timer duration may be adjusted based on engine speed and load. For example, the heat timer may not comprise a strict timer that increments above predetermined engine speed and load thresholds, but instead may be variable based on indicated engine speed and load. For example, the heat-timer may be increased responsive to decreasing engine speed and load (where engine speed and load are still above the predetermined thresholds indicate at step 510 of method 500, and may be decreased responsive to increasing engine speed and load. In further examples, the heat-timer duration may additionally be adjusted based on coolant flow rate. In still further examples, the heat-timer duration may additionally be adjusted based on ambient temperature. For example, the heat-timer duration may be increased as ambient temperature is decreased, or heat-timer duration may be decreased as ambient temperature is increased. Accordingly, heat-timer duration may be based on engine operating conditions, in addition to ambient temperature, and as such, monitor accuracy may be increased, thus preventing or reducing false fails/false passes of the monitor.

Proceeding to 525, method 500 may include monitoring engine coolant temperature. Engine coolant temperature may be monitored by an ECT sensor, as indicated above. Proceeding to 530, method 500 may include indicating whether ECT is below a predetermined threshold. For example, in the case of the Tstat monitor, it may be indicated whether ECT is below the Tstat fault threshold (e.g., 252), as described above with regard to FIG. 2C. Alternatively, in the case of the TTCL monitor, it may be indicated whether ECT is below the closed-loop fault threshold (e.g., 276), as described above with regard to FIG. 2D. If, at 530, it is indicated that ECT is below the Tstat fault threshold, for the case of the Tstat monitor, or below the closed-loop fault threshold, for the case of the TTCL monitor, method 500 may proceed to 535. At 535, method 500 may include indicating whether the heat-timer has expired. If the heat timer has not expired, method 500 may proceed to 540 where it may be indicated whether a ratio of "no-heat" time during the engine start/warmup to the total time since engine start (based on the FES timer) is greater than a predetermined threshold. For example, as described above with regard to FIG. 4, the ratio of no-heat time to total engine run time since the start (FES) may be referred to as an "idle ratio". In one example, if it is indicated that the idle ratio is greater than 0.5 (e.g., greater than 50% of the total engine run time since FES spent in the no-heat zone), method 500 may proceed to 545. At 545, a no-call may be made. For example, if the Tstat monitor was running, a no-call may be made as to whether the Tstat is functioning as desired. In another example, if the TTCL monitor was running, a no-call may be made as to whether the engine may enter into stoichiometric closed-loop engine operation. As described above, responsive to a no-call being made, the engine controller may continue to operate in an open-loop manner. For example, the fuel pulse width may be determined from the mass air flow entering the engine and the desired air/fuel ratio without short term feedback correction from the exhaust gas oxygen sensor (e.g., 126). Returning to 540, if it is indicated that the idle ratio is not greater than 0.5 (e.g., less than 50% of the total engine run time since FES spent in the no-heat zone), method 500 may return to 530 and may include indicating whether ECT is below the predetermined thresholds, as described above with respect to step 530.

Returning to step 535, if it is indicated that ECT is below the predetermined thresholds (e.g., below the Tstat fault threshold for the case of the Tstat monitor, or below the closed-loop fault threshold for the case of the TTCL monitor), and it is further indicated that the heat timer expired, method 500 may proceed to 550. At 550, method 500 may include indicating a negative result. For example, if the Tstat monitor is running, a negative result for the Tstat monitor may be indicated. If the TTCL monitor is running, a negative result for the TTCL monitor may be indicated. Alternatively, returning to 530, if it is indicated that ECT is not below predetermined thresholds as described above, method 500 may proceed to 555. At 555, method 500 may include indicating a passing result. For example, if the Tstat monitor is running, a passing result for the Tstat monitor may be indicated. If the TTCL monitor is running, a passing result for the TTCL monitor may be indicated.

Figure 6:
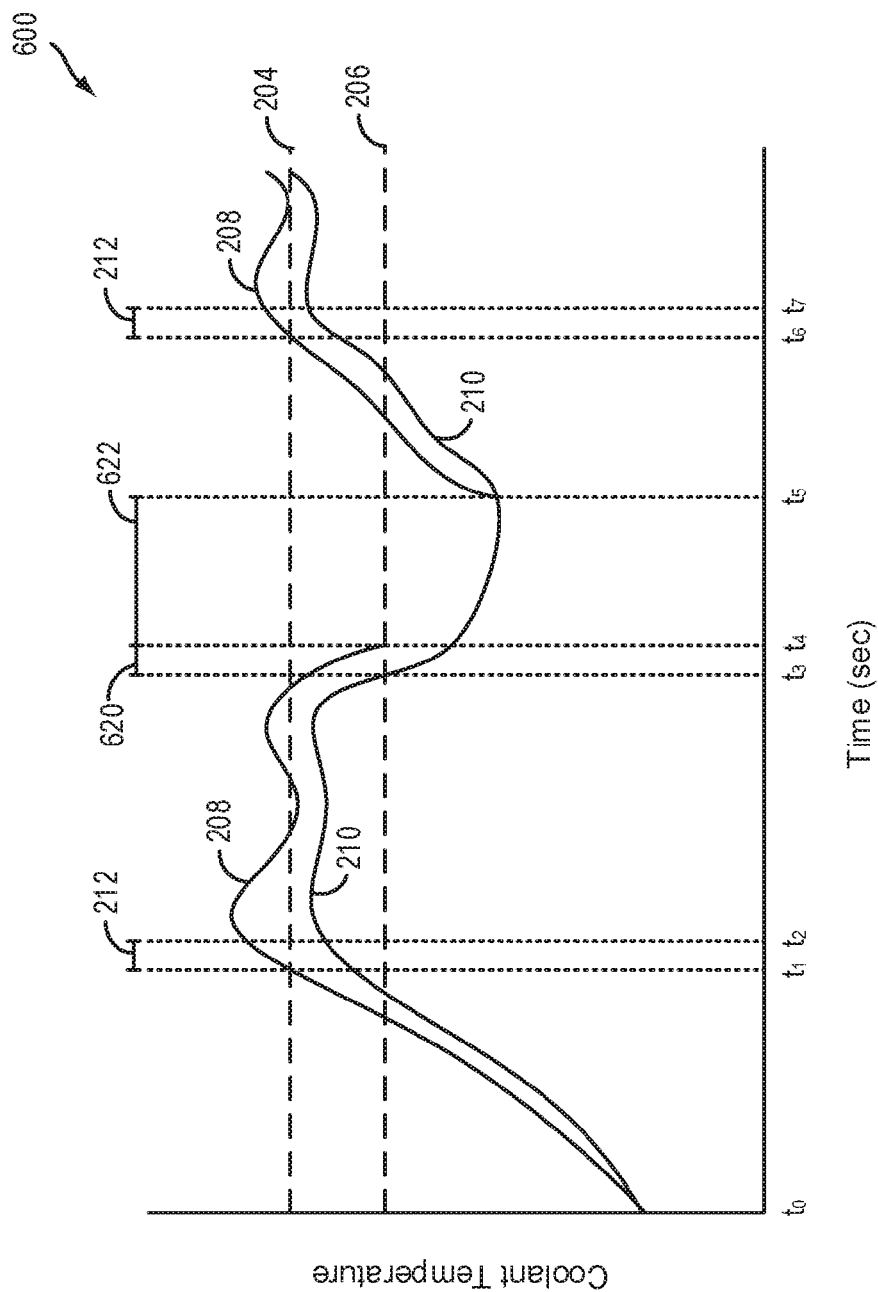
FIG. 6 shows an example timeline illustrating continuous monitoring of a vehicle thermostat function during engine operation.

Turning now to FIG. 6, an example illustration 600 is presented detailing continuous monitoring for thermostat (Tstat) diagnostics during engine operation. More specifically, responsive to an indication that the Tstat is functioning as desired during engine startup/warmup, Tstat function may continuously be monitoring during the current and subsequent drive cycles. In other words, a "warm engine continuous test monitor" may be enabled once a warm-up test has completed and it is determined that no fault exists. Details of the continuous test will be described below. Briefly, responsive to measured ECT dropping below a Tstat fault threshold, the warm-up test as depicted in FIG. 2A may be reinitialized to run. As such, included in the example illustration of FIG. 6 are aspects previously discussed with regard to FIG. 2A and with regard to method 400 depicted in FIG. 4. Accordingly, aspects of FIG. 6 that are the same as aspects of FIG. 2 are referred to herein with the same reference number. Furthermore, while continuous monitoring of the Tstat is described herein, it may be understood that similar methodology may be applied to stoichiometric closed-loop engine operation, without departing from the scope of this disclosure.

As discussed, FIG. 6 illustrates a model-based approach for indicating when ECT is above a fault threshold in order to indicate whether the vehicle Tstat is functioning as desired, and responsive to a passing result, the Tstat may be continuously monitored. As such, a Tstat regulating temperature 204, and a Tstat fault threshold 206, are indicated. An inferred ECT 208 is illustrated, over time, the inferred ECT 208 derived from the ECT inference model, as discussed above. Additionally, a measured ECT 210 is indicated, over time, the measured ECT based on, for example, an ECT sensor (e.g., 14). A call delay 212 is further illustrated, as discussed above with regard to FIG. 2A, and which will be discussed in further detail below. Additionally, a "reset stabilization" delay timer 620, and an "inference stabilization" delay timer 622 are further illustrated, both of which will be described in detail below.

At time $t_0$ an engine start is initiated. The thermostat monitor may be initiated to run responsive to ECT temperature entry conditions being met. As described above, the monitor may be enabled to run responsive to an engine start where the ECT is more than 35° F. below the Tstat fault threshold 206, or in some examples the monitor may be enabled to run responsive to ECT below the Tstat fault threshold 206 by any amount. As such, responsive to the engine being started at time $t_0$, the ECT inference model is initiated and inferred ECT 208 is indicated to rise accordingly between time $t_0$ and $t_1$ responsive to engine operation. With the engine in operation, heat from the combustion process heats the engine coolant, and thus measured ECT 210 is indicated to rise between time $t_0$ and $t_1$.

Between time $t_0$ and $t_1$, measured ECT 210 reaches the Tstat fault threshold, and as such a passing result may be indicated and a diagnostic trouble code (DTC) state advanced accordingly. However, as discussed above, in some examples measured ECT 210 may not reach the Tstat fault threshold at a time point wherein inferred ECT 208 reaches the Tstat regulating temperature 204 (e.g., time $t_1$). In such an example, if inferred ECT 208 reaches the Tstat regulating temperature while measured ECT 210 is below Tstat fault threshold 206, a call-delay timer 212 may be activated at time $t_1$ to prevent the monitor from making a negative call or a no-call, responsive to inferred ECT 208 instantaneously crossing the Tstat regulating temperature 204 at time $t_1$. While the call delay 212 is activated, if measured ECT is indicated to reach Tstat fault threshold 206, a passing result may be indicated. However, if the call delay expires (e.g., at time $t_2$) without the measured ECT 210 reaching the Tstat fault threshold 206, a negative result may in some examples be indicated, while in other examples a no-call may be indicated as discussed above. However, in the example illustration in FIG. 6, measured ECT is indicated to reach Tstat threshold 206 between time $t_0$ and $t_1$. As such, a passing result may be indicated, and it may be determined that the Tstat is functioning as desired.

As the thermostat is indicated to be functioning as desired, the warm-engine continuous test monitor may be enabled, in order to monitor thermostat function during the current drive cycle. Between time $t_1$ and $t_3$, while the continuous test monitor is enabled, measured ECT 210 remains above the Tstat fault threshold 206. As such, no action is taken during the time period between time $t_1$ and $t_3$. However, at time $t_3$, measured ECT 210 drops below Tstat fault threshold 206. However, a call is not immediately made with regard to measured ECT 210 dropping below Tstat fault threshold 206. Instead, in order to prevent falsely resetting the monitor due to ECT fluctuations/oscillations around Tstat fault threshold 206, reset stabilization delay timer 620 may be activated. In some examples, reset stabilization delay timer 620 may be activated for a time period of 3-5 seconds, where no call is made as to whether to re-initiate the warm-up test, as discussed herein. As such, between time $t_3$ and $t_4$, a call may be prevented from being made. Between time $t_3$ and $t_4$ measured ECT 210 is indicated to remain below Tstat fault threshold 206. Reset stabilization timer expires at time $t_4$, and as measured ECT remained below Tstat fault threshold 206, it may be determined that the warm-up test Tstat monitor may be re-run. However, prior to arming the warm-up test Tstat monitor, inference stabilization delay timer 622 may be enabled. More specifically, in order to re-run the monitor, the ECT inference model may be reinitialized to the ECT sensor value and run. However, the ECT inference model is very sensitive to any engine speed and/or load changes close to the monitoring threshold (Tstat fault threshold 206). As such, in order to prevent false fail calls, inference stabilization delay timer 622 may be activated at time $t_4$ to prevent the Tstat monitor from being re-run. In some examples, the inference stabilization delay timer 622 may be activated for a predetermined stabilization time (e.g., 30-45 seconds). In other examples, the predetermined stabilization time may comprise an amount of time greater than, or less than 30-45 seconds. While inference stabilization delay timer 622 is activated, no call may be made and the Tstat monitor may be prevented from running. As such, with the monitor prevented from running, inferred ECT 208 is not indicated (discontinued at time $t_4$), responsive to the initiation of inference stabilization delay timer 622. However, ECT may continue being monitored, as indicated by plot 210, for the duration comprising the time the inference stabilization delay timer 622 is activated.

At time $t_5$, inference stabilization delay timer 622 expires. Accordingly, the warm-up Tstat monitor may be armed and activated to re-run. As described above, once the monitor is armed and ready to be re-run, the inference model may be re-initialized to the ECT sensor value (e.g., measured ECT 210) and the monitor may be activated to re-run. Accordingly at time $t_5$, inferred ECT 208 is indicated to rise between time $t_5$ and $t_6$, responsive to engine operation, as described above.

Between time $t_5$ and $t_6$, measured ECT 210 reaches the Tstat fault threshold, and as such a passing result may be indicated and a diagnostic trouble code (DTC) state advanced accordingly. For reference, call delay timer 212 is again shown beginning at time $t_6$ and expiring at time $t_7$ and is illustrated to emphasize that during re-running the Tstat monitor during continuous monitoring, if measured ECT 210 does not reach the Tstat fault threshold at a time point wherein inferred ECT 208 reaches the Tstat regulating temperature 204 (e.g., time $t_6$), call-delay timer 212 may be activated at time $t_1$ to prevent the monitor from making a negative call or a no-call. Again, while call delay 212 is activated, if measured ECT is indicated to reach Tstat fault threshold 206, a passing result may be indicated. However, if the call delay expires (e.g., at time $t_2$) without the measured ECT 210 reaching the Tstat fault threshold 206, a negative result may in some examples be indicated, while in other examples a no-call may be indicated as discussed above. However, in the example illustration in FIG. 6, measured ECT is indicated to reach Tstat threshold 206 between time $t_5$ and $t_6$. As such, a passing result may be indicated, and it may be determined that the Tstat is functioning as desired.

As the thermostat is indicated to be functioning as desired at time $t_7$, the warm-engine continuous test monitor may again be enabled, as described above.

Turning now to FIG. 7, a flow chart for a high level example method for continuously monitoring a vehicle thermostat (Tstat) during engine operation, is shown. More specifically, method 700 continues from method 400 and includes, responsive to an indication that the vehicle Tstat is functioning as desired (e.g., no fault exists) based on a warm-up Tstat monitor (e.g., FIG. 2A, FIG. 6), continuously monitoring the vehicle Tstat during the current drive cycle. During continuous monitoring of the Tstat, responsive to an indication that measured engine coolant temperature (ECT) drops below a Tstat fault threshold (engine coolant temperature threshold), the warm-up Tstat monitor may be reinitialized to run. However, prior to reinitializing the warm-up Tstat monitor to run, a reset stabilization delay timer may be activated during which time no-call may be made as to whether to reinitiate the warm-up test, in order to prevent falsely resetting the monitor due to ECT fluctuations/oscillations around the Tstat fault threshold. If measured ECT remains below the Tstat fault threshold while the reset stabilization delay timer is activated, an inference stabilization delay timer may subsequently be activated, that may delay running the warm-up Tstat monitor for a period of time, to prevent false fail calls as the inference model for the warm-up Tstat monitor is very sensitive to speed/load changes near the Tstat fault threshold. As such, following expiration of the inference stabilization timer, the monitor may be reinitialized to run. In other words, running a continuous thermostat monitor may include indicating an engine coolant temperature below an engine coolant temperature threshold and, responsive to the engine coolant temperature below the engine coolant temperature threshold for a predetermined time period (e.g., reset stabilization delay timer), reinitiating the engine coolant temperature inference model after another predetermined time period (e.g., inference stabilization delay timer). Method 700 will be described with reference to the system described herein and shown in FIGS. 1A-1B, though it should be understood that similar methods may be applied to other systems without departing from the scope of this disclosure. Method 700 may be carried out by a controller, such as controller 12 in FIGS. 1A-1B, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIG. 1. The controller may control fuel system actuators such as fuel injectors (e.g., 66), and other devices such as a thermostat valve, intake and exhaust valve timing, intake valve lift, purge control valve (not shown), air compressor bypass valve (not shown), throttle (e.g., 62), according to the methods below. Furthermore, while continuous monitoring of the Tstat is described herein, it may be understood that similar methodology may be applied to stoichiometric closed-loop engine operation, without departing from the scope of this disclosure.

Method 700 begins at 705 and includes recording the passing result from the warm-up Tstat (e.g., FIG. 2A, FIG. 4, FIG. 6) monitor at the controller (e.g., latching the passing result). Proceeding to 710, method 700 may include indicating whether measured ECT (e.g., 210) is below a Tstat fault threshold (e.g., 206). Additionally, it may be indicated whether stabilization timers, for example reset stabilization delay timer (e.g., 620) and inference stabilization delay timer (e.g., 622), are not active. If, at 710, measured ECT is not below the Tstat fault threshold and stabilization timers are not active, method 700 may proceed to 715. At 715, method 700 may include continuing to monitor ECT, via an ECT sensor, as described above. However, if at 710 it is indicated that measured ECT is below the Tstat fault threshold, and that stabilization timers are not active, method 700 may proceed to 720. At 720, first engine start (FES) timer may be reset. Proceeding to 725, method 700 may include activating reset stabilization delay timer (e.g., 620). As described above, reset stabilization delay timer may prevent a call from being made as to whether to reinitiate the warm-up Tstat monitor, to prevent falsely resetting the monitor due to ECT fluctuations/oscillations around the Tstat fault threshold (e.g., 206). Responsive to resetting the FES timer and activating the reset stabilization delay timer, method 700 may proceed to 730. At 730, method 700 may include monitoring ECT, based on the ECT sensor, as described above. At 735, method 700 may include indicating whether measured ECT (e.g., 210) is below the Tstat fault threshold (e.g., 206). If measured ECT is not still below the Tstat fault threshold, method 700 may return to 715, and may include continuing to monitor ECT. However, if at 735 it is indicated that measured ECT (e.g., 210) is still below the Tstat fault threshold, method 700 may proceed to 740.

At 740, method 700 may include indicating whether the FES timer is greater than a first threshold. As described above, the threshold may comprise 3-5 seconds. In other words, the reset stabilization delay timer may be activated for a period of 3-5 seconds, and the time period may be set based on the FES timer. As such, at 740 if it is indicated that the FES timer is not greater than the first threshold (e.g., 3-5 sec), method 700 may return to 730 and may include continuing to monitor ECT while the reset stabilization delay timer is activated. Alternatively, if at 740 it is indicated that the FES timer is greater than the first threshold, method 700 may proceed to 745.

At 745, method 700 may include resetting the thermostat monitor and de-latching the ECT pass result. In other words, responsive to the FES timer reaching the first threshold while measured ECT (e.g., 210) remained below the Tstat fault threshold (e.g., 206), the thermostat monitor may be reset and a passing result for the Tstat monitor no longer latched at the controller. Proceeding to 750, method 700 may include deactivating the reset stabilization timer (e.g., 620). As discussed, the reset stabilization timer prevented the controller from making a call until the FES timer reached the first threshold. However, responsive to deactivating the reset stabilization timer, the monitor may not immediately be reinitialized to run. Instead, method 700 may proceed to 755, where the FES timer may again be reset. Subsequent to the FES timer being reset at 755, method 700 may proceed to 760, and may include activating the inference stabilization delay timer (e.g., 622). As described above with regard to FIG. 6, the ECT inference model is very sensitive to any engine speed and/or load changes close to the monitoring threshold (e.g., Tstat fault threshold 206), and as such the inference stabilization delay timer may be activated in order to prevent false fail calls by preventing the Tstat monitor from being re-run for a duration. As described above, in some examples the inference stabilization delay timer may be activated for a predetermined amount of time. The timeframe for the inference stabilization delay timer being activated may be based on the FES timer. Accordingly, subsequent to activating the inference stabilization delay timer, method 700 may proceed to 765, and may include indicating whether the FES timer is greater than a second threshold, the threshold comprising 30-45 seconds, for example, as described above. If the FES timer is not greater than the second threshold at 765, method 700 may continue with the inference stabilization delay timer activated, to prevent the Tstat monitor from being re-run. However, responsive to the FES timer reaching the second threshold at time 765, method 700 may proceed to 770.

At 770, method 700 may include re-enabling (reinitializing) the model-based Tstat monitor, as described in detail with regard to FIG. 2A and FIG. 6A, and with regard to the method depicted in FIG. 4. Furthermore, at 770, method 700 may include deactivating the inference stabilization delay timer. More specifically, as the inference stabilization timer prevents the Tstat monitor from being re-run, the inference stabilization delay timer may be deactivated such that the Tstat monitor may be reinitiated to run.

In summary, method 700 may be used to, during a first mode of operation of an engine, predict when temperature of a coolant of the engine exceeds a threshold temperature; indicate proper operation of the thermostat in response to an actual coolant temperature exceeding the threshold and, continue to monitor for the actual coolant temperature exceeding the threshold or portion thereof after the first mode of operation. In one example, responsive to an indication that the actual coolant temperature dropped below the threshold for a first predetermined time duration (e.g., reset stabilization delay timer) after the first mode of operation, a call may be initiated to reinitiate the first mode of operation to predict when temperature of the coolant exceeds the threshold temperature. Proper operation of the thermostat may be thus indicated responsive to actual coolant temperature exceeding the threshold temperature. Furthermore, reinitiating the first mode of operation may commence subsequent to another (second) predetermined time duration (e.g., inference stabilization delay timer), the second predetermined time duration greater than the first predetermined time duration. During the second predetermined time duration (e.g., inference stabilization delay timer), ECT inference model calculations may be placed on hold.

In this way, engine coolant system monitoring may be accurately conducted during engine start events by enabling an engine coolant temperature inference model at ambient temperatures above a predetermined threshold temperature, and a heat-timer based monitor at ambient temperatures below the predetermined threshold temperature. Accordingly, false fails of either a thermostat (Tstat) monitor, or a time-to-closed-loop (TTCL) monitor, may be reduced at ambient temperatures below the predetermined threshold temperature. Furthermore, in an example where an engine coolant temperature inference model is used to indicate whether a vehicle Tstat is functioning as desired, responsive to an indication that no fault exists, continuous monitoring of the Tstat may be enabled. Continuous monitoring may comprise initiating a call to re-run the Tstat monitor responsive to a measured engine coolant temperature dropping below a predetermined threshold temperature for a predetermined time period (e.g., reset stabilization). Subsequent to the call to re-run the Tstat monitor, the Tstat monitor may be delayed by another predetermined time period (e.g., inference stabilization), prior to enabling the Tstat monitor to re-run. By only initiating a call to re-run the Tstat monitor responsive to a measured engine coolant temperature dropping below the predetermined threshold temperature for the predetermined time period, resets of the monitor due to oscillations/fluctuations around the threshold may be prevented. Furthermore, by delaying the Tstat monitor from re-running subsequent to a call to re-run the Tstat monitor being initiated, false fails of the monitor due to engine speed/load changes around the threshold temperature may be prevented.

The technical effect is to enable a Tstat monitor and/or a TTCL monitor to be based on an engine coolant temperature inference model at ambient temperatures above a predetermined threshold temperature, while enabling a heat-timer based approach at ambient temperatures below the predetermined threshold temperature. In examples where the Tstat monitor is enabled via the engine coolant temperature inference model, continuous monitoring of the Tstat function may serve to indicate whether the Tstat is functioning as desired throughout a drive cycle, improving engine operation, customer satisfaction, and preventing or reducing engine degradation.

The systems described herein and with reference to FIGS. 1-2, along with the methods described herein and with reference to FIGS. 3-5 and FIG. 7, may enable one or more systems and one or more methods. In one example, a method comprises in a first condition, detecting an engine coolant system malfunction based on an engine coolant temperature inference model; and in a second condition, detecting an engine coolant system malfunction based on a time-based monitor. In a first example of the method, the method further includes wherein the first condition includes an ambient temperature above 20° F. A second example of the method optionally includes the first example and further includes wherein the second condition includes an ambient temperature below 20° F. A third example of the method optionally includes any one or more or each of the first and second examples and further includes wherein the first condition comprises an engine start event and further comprises: responsive to an indication that no fault exists, enabling a continuous thermostat monitor. A fourth example of the method optionally includes any one or more or each of the first through third examples and further includes wherein the continuous thermostat monitor further comprises: indicating an engine coolant temperature below an engine coolant temperature threshold; and responsive to the engine coolant temperature below the engine coolant temperature threshold for a predetermined time period: reinitiating the engine coolant temperature inference model after another predetermined time period. A fifth example of the method optionally includes any one or more or each of the first through fourth examples and further includes wherein the second condition comprises an engine start event and further comprises: activating the time-based monitor based on one or more of engine speed and/or engine load above predetermined thresholds; and wherein a fault is indicated responsive to an engine coolant temperature below a predetermined threshold when the time-based monitor expires. A sixth example of the method optionally includes any one or more or each of the first through fifth examples and further includes wherein engine coolant system malfunction comprises a thermostat malfunction. A seventh example of the method optionally includes any one or more or each of the first through sixth examples and further includes wherein engine coolant system malfunction prevents stoichiometric closed-loop engine operation. An eighth example of the method optionally includes any one or more or each of the first through seventh examples and further includes wherein both the engine coolant temperature inference model and the time-based monitor are run in parallel; and responsive to an ambient temperature change to below a predetermined threshold during running the engine coolant temperature inference model and the time-based monitor in parallel: deactivating the engine coolant temperature inference model. A ninth example of the method optionally includes any one or more or each of the first through eighth examples and further includes wherein the engine coolant temperature inference model further comprises a dual-lump capacitance model for modeling either engine metal or coolant temperatures.

Another example of a method comprises during a first mode of operation of an engine, predicting when temperature of a coolant of the engine exceeds a threshold temperature; and indicating improper operation of a thermostat regulating flow of the coolant in response to an actual coolant temperature below the threshold, after a predetermined delay from the predicted coolant temperature exceeding the threshold temperature. In a first example of the method, the method further comprises indicating entry conditions are not met for feedback control of an air/fuel mixture combusted in the engine in response to an actual coolant temperature below a second threshold, after a predetermined delay from the predicted coolant temperature exceeding the second threshold. A second example of the method optionally includes the first example and further includes wherein the first mode of operation comprises a starting of the engine; and wherein no call is made as to whether the thermostat is operating properly, or whether entry conditions are met for feedback control of the air/fuel mixture combusted in the engine responsive to an indication of one or more of engine speed and load below a heat threshold for greater than a predetermined time period during starting the engine. A third example of the method optionally includes any one or more or each of the first and second examples and further includes wherein the predicting when temperature of a coolant of the engine exceeds a threshold temperature is based on an engine temperature inference model which is in turn is based on a dual-lump capacitance model for modeling either engine metal or coolant temperatures. A fourth example of the method optionally includes any one or more or each of the first through third examples and further includes wherein the engine temperature inference model is employed when ambient temperature exceeds a preselected temperature. A fifth example of the method optionally includes any one or more or each of the first through fourth examples and further includes wherein the predicting when temperature of a coolant of the engine exceeds a threshold temperature is based on a calibrated time after start of the engine, and the calibrated time is employed when ambient temperature is less than a preselected temperature.

Another example of a method comprises during a first mode of operation of an engine, predicting when temperature of a coolant of the engine exceeds a threshold temperature, wherein the predicting is based on an engine coolant temperature inference model; indicating proper operation of a thermostat regulating flow of the coolant in response to an actual coolant temperature exceeding the threshold; and continuing to monitor for the actual coolant temperature exceeding the threshold after the first mode of operation. In a first example of the method, the method further comprises continuing to monitor for the predicted coolant temperature exceeding the threshold or portion thereof after the first mode of operation. A second example of the method optionally includes the first example and further comprises responsive to an indication of the actual coolant temperature dropping below the threshold for a first predetermined time duration after the first mode of operation: initiating a call to reinitiate the first mode of operation to predict when temperature of the coolant exceeds the threshold temperature, and indicating proper operation of the thermostat responsive to actual coolant temperature exceeding the threshold temperature; and wherein initiating the call to reinitiate the first mode of operation occurs any number of times actual coolant temperature drops below the threshold for the first predetermined time duration during a drive cycle. A third example of the method optionally includes any one or more or each of the first and second examples and further includes wherein reinitiating the first mode of operation commences subsequent to a second predetermined time duration, the second predetermined time duration greater than the first predetermined time duration; and wherein predicting when temperature of the coolant of the engine exceeds the threshold temperature is suspended during the second predetermined time duration. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   in a first condition, detecting an engine coolant system malfunction based on an engine coolant temperature inference model; and
   in a second condition, detecting an engine coolant system malfunction based on a time-based monitor.

2. The method of claim 1, wherein the first condition includes an ambient temperature above 20° F.

3. The method of claim 1, wherein the second condition includes an ambient temperature below 20° F.

4. The method of claim 1, wherein the first condition comprises an engine start event and further comprises:
   responsive to an indication that no fault exists, enabling a continuous thermostat monitor.

5. The method of claim 4, wherein the continuous thermostat monitor further comprises:
   indicating an engine coolant temperature below an engine coolant temperature threshold; and
   responsive to the engine coolant temperature below the engine coolant temperature threshold for a predetermined time period:
      reinitiating the engine coolant temperature inference model after another predetermined time period.

6. The method of claim 1, wherein the second condition comprises an engine start event and further comprises:
   activating the time-based monitor based on one or more of engine speed and/or engine load above predetermined thresholds; and wherein
   a fault is indicated responsive to an engine coolant temperature below a predetermined threshold when the time-based monitor expires.

7. The method of claim 1, wherein engine coolant system malfunction comprises a thermostat malfunction.

8. The method of claim 1, wherein engine coolant system malfunction prevents stoichiometric closed-loop engine operation.

9. The method of claim 1, wherein both the engine coolant temperature inference model and the time-based monitor are run in parallel; and
   responsive to an ambient temperature change to below a predetermined threshold during running the engine coolant temperature inference model and the time-based monitor in parallel:
   deactivating the engine coolant temperature inference model.

10. The method of claim 1, wherein the engine coolant temperature inference model further comprises a dual-lump capacitance model for modeling either engine metal or coolant temperatures.

11. A method comprising:
    during a first mode of operation of an engine, predicting when temperature of a coolant of the engine exceeds a threshold temperature;
    indicating improper operation of a thermostat regulating flow of the coolant in response to an actual coolant temperature below the threshold temperature, after a predetermined delay from when the coolant is predicted to exceed the threshold temperature; and
    indicating entry conditions are not met for feedback control of an air/fuel mixture combusted in the engine in response to the actual coolant temperature being below the threshold temperature after the predetermined delay from when the coolant is predicted to exceed the threshold temperature.

12. The method recited in claim 11, wherein the first mode of operation comprises a starting of the engine; and wherein a no call is made as to whether the thermostat is operating properly, or whether entry conditions are met for feedback control of the air/fuel mixture combusted in the engine responsive to an indication of one or more of engine speed and/or load below a heat threshold for greater than a predetermined time period during starting the engine.

13. The method recited in claim 11, wherein the predicting when temperature of the coolant of the engine exceeds the threshold temperature is based on an engine temperature inference model which in turn is based on a dual-lump capacitance model for modeling either engine metal or coolant temperatures.

14. The method of claim 13, wherein the engine temperature inference model is employed when ambient temperature exceeds a preselected temperature.

15. The method recited in claim 11, wherein the predicting when temperature of the coolant of the engine exceeds the threshold temperature is based on a calibrated time after start of the engine, and the calibrated time is employed when ambient temperature is less than a preselected temperature.

16. A method comprising:
    during a first mode of operation of an engine, predicting when temperature of a coolant of the engine exceeds a threshold temperature, wherein the predicting is based on an engine coolant temperature inference model;
    indicating proper operation of a thermostat regulating flow of the coolant in response to an actual coolant temperature exceeding the threshold temperature;
    continuing to monitor for the actual coolant temperature exceeding the threshold temperature after the first mode of operation temperature; and
    responsive to an indication of the actual coolant temperature dropping below the threshold temperature for a first predetermined time duration after the first mode of operation, initiating a call to reinitiate the first mode of operation to predict when temperature of the coolant exceeds the threshold temperature and indicating proper operation of the thermostat responsive to the actual coolant temperature exceeding the threshold temperature, wherein initiating the call to reinitiate the first mode of operation occurs any number of times the actual coolant temperature drops below the threshold temperature for the first predetermined time duration during a drive cycle.

17. The method of claim 16, further comprising continuing to monitor for the predicted coolant temperature exceeding the threshold temperature or portion thereof after the first mode of operation.

18. The method of claim 16, wherein reinitiating the first mode of operation commences subsequent to a second predetermined time duration, the second predetermined time duration greater than the first predetermined time duration; and wherein
    predicting when temperature of the coolant of the engine exceeds the threshold temperature is suspended during the second predetermined time duration.

* * * * *